(12) United States Patent
Inosaka et al.

(10) Patent No.: US 12,682,860 B2

(45) Date of Patent: Jul. 14, 2026

(54) DISPLAY CONTROL DEVICE, DISPLAY DEVICE, AND DISPLAY CONTROL METHOD

(71) Applicant: Nippon Seiki Co., Ltd., Niigata (JP)

(72) Inventors: Yuji Inosaka, Niigata (JP); Yukihisa Hoshi, Niigata (JP); Yuri Sato, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 19/092,439

(22) Filed: Mar. 27, 2025

(65) Prior Publication Data

US 2025/0336372 A1 Oct. 30, 2025

(30) Foreign Application Priority Data

| | | | |
|---|---|---|---|
| Apr. 25, 2024 | (JP) | ................................. | 2024-071438 |
| Nov. 22, 2024 | (JP) | ................................. | 2024-203629 |

(51) Int. Cl.
  *G09G 3/34* (2006.01)
  *G09G 3/00* (2006.01)
    (Continued)

(52) U.S. Cl.
  CPC ........... *G09G 3/3426* (2013.01); *G09G 3/002* (2013.01); *B60K 35/23* (2024.01); *B60K 35/81* (2024.01);
    (Continued)

(58) Field of Classification Search
  CPC .................. G09G 3/002; G09G 3/003; G09G 3/34–3696; G09G 2310/06;
    (Continued)

(56) References Cited

U.S. PATENT DOCUMENTS

| | | | |
|---|---|---|---|
| 8,223,277 B2 * | 7/2012 | Ohtoshi | ................. G09G 3/003 348/113 |
| 2010/0111491 A1 * | 5/2010 | Kamoto | ................ G06F 3/1446 386/207 |

(Continued)

FOREIGN PATENT DOCUMENTS

| | | | | |
|---|---|---|---|---|
| JP | 2011-70074 A | 4/2011 | | |
| JP | 2014142474 A | * 8/2014 | ......... | G02B 27/0101 |
| WO | WO-2023210684 A1 | * 11/2023 | ........ | B60W 60/0053 |

OTHER PUBLICATIONS

English translation of JP-2014142474-A (Year: 2014).*
English translation of WO-2023210684-A1 (Year: 2023).*

*Primary Examiner* — Nathan Danielsen

(74) *Attorney, Agent, or Firm* — Rimon P.C.

(57) ABSTRACT

Control units of a display control device perform, in a switching period when display by one image generation unit out of a first image generation unit and a second image generation unit is terminated and display by the other image generation unit is started, a parallel control in which a display start operation is performed in parallel with a display termination operation, a conjunctive control in which an operation timing of the other image generation unit is determined with an operation timing of the one image generation unit as a starting point, and an overlapping lighting suppression control that prevents, in the switching period, an ON period of a light source unit in the one image generation unit and an ON period of a light source unit in the other image generation unit from temporally overlapping each other in at least a partial period.

15 Claims, 17 Drawing Sheets

(51) Int. Cl.
  *B60K 35/23*      (2024.01)
  *B60K 35/81*      (2024.01)

(52) U.S. Cl.
  CPC .. *B60K 2360/1526* (2024.01); *B60K 2360/31*
    (2024.01); *B60K 2360/343* (2024.01); *G09G*
    *2310/08* (2013.01); *G09G 2360/04* (2013.01);
    *G09G 2380/10* (2013.01)

(58) Field of Classification Search
  CPC ........ G09G 2310/08; G09G 2320/0247–0257;
    G09G 2320/0266; G09G 2360/04; G09G
    2380/10; G06F 3/1423–1438; B60K
    35/21; B60K 35/23; B60K 35/29; B60K
    35/80; B60K 35/81; B60K 2360/31;
    B60K 2360/42; B60K 2360/182; B60K
    2360/334; B60K 2360/343; B60K
    2360/1526
  See application file for complete search history.

(56)              References Cited

U.S. PATENT DOCUMENTS

| | | | |
|---|---|---|---|
| 2011/0074657 A1 | 3/2011 | Sugiyama et al. | |
| 2022/0208041 A1* | 6/2022 | Ikeda ..................... | G09G 3/003 |
| 2022/0382105 A1* | 12/2022 | Harada ................ | G09G 3/3406 |
| 2025/0299640 A1* | 9/2025 | Tang ..................... | G09G 3/002 |

\* cited by examiner

Fig.4A
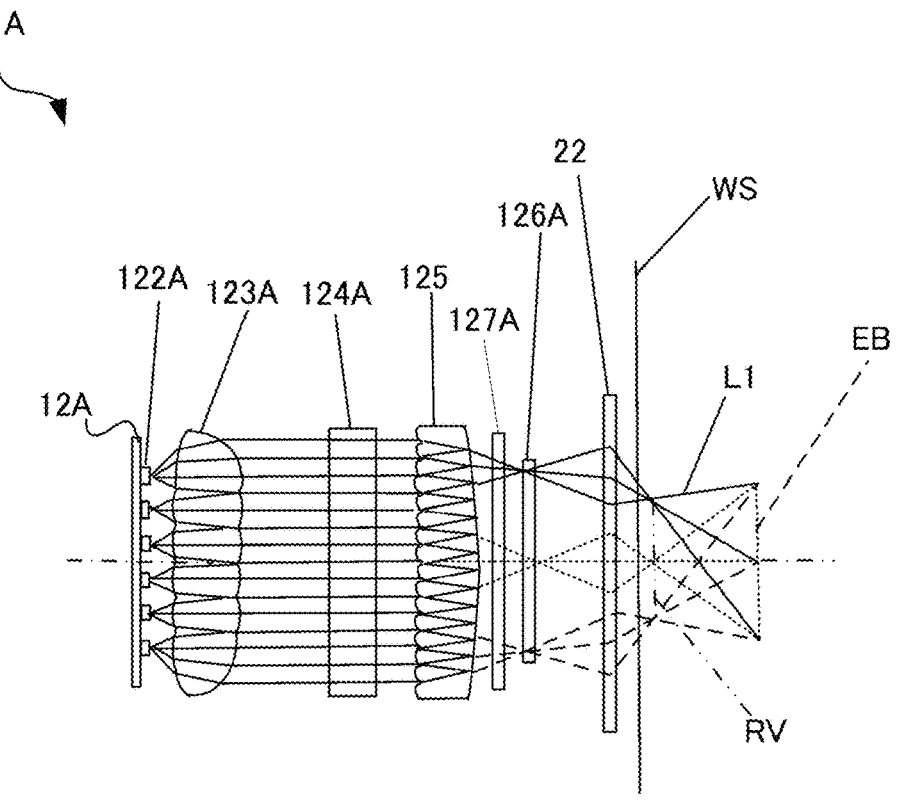
Fig.4B
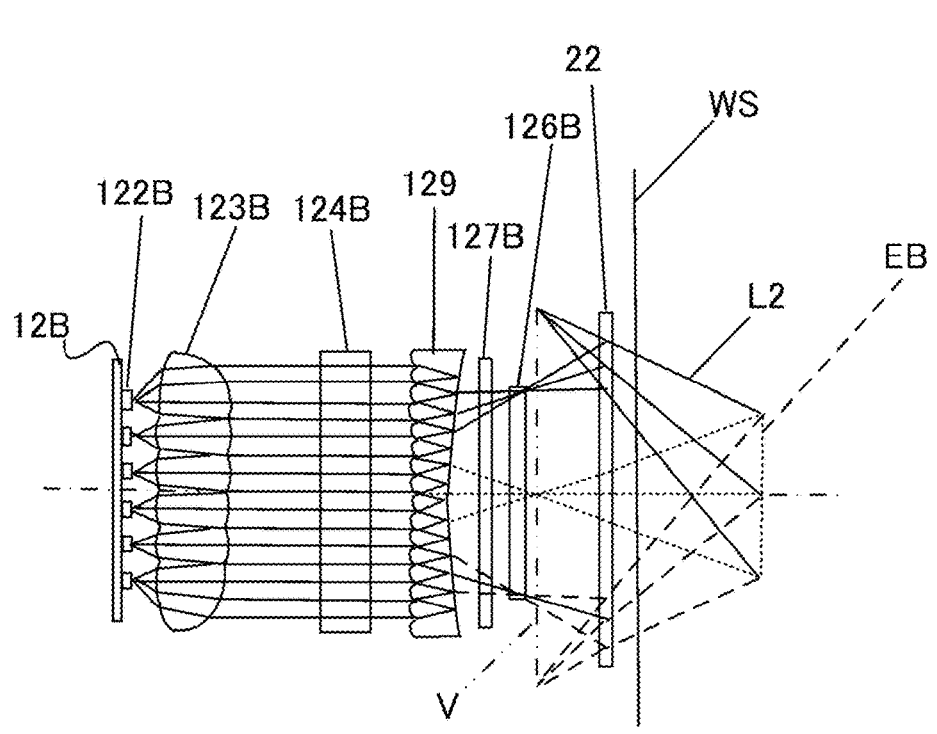

PARALLEL AND CONJUNCTIVE CONTROLS OF ACTIVATION AND TERMINATION SEQUENCES IN FIRST AND SECOND DISPLAY UNITS (EXAMPLE IN WHICH SIGNAL IS INPUT TO EACH DISPLAY UNIT VIA COMMON SIGNAL LINE)

FIRST CONJUNCTIVE CONTROL
·EXECUTE ACTIVATION (RESET CANCEL) OF ONE DISPLAY UNIT IN CONJUNCTION WITH ACTIVATION (RESET CANCEL) OF OTHER DISPLAY UNIT ⟋S1

START OF IMAGE DISPLAY
·EXECUTE ACTIVATION PROCESSING (INPUT OF VIDEO SIGNAL, DISPLAY-ON STATE, AND BACKLIGHT-ON) IN ONE DISPLAY UNIT AND START IMAGE DISPLAY IN ONE DISPLAY UNIT
·OTHER DISPLAY UNIT IS IN MIDDLE OF ACTIVATION (RESET CANCEL PHASE) AND IN STANDBY MODE, AND LOW-POWER CONSUMPTION STATE CONTINUES ⟋S5

SECOND CONJUNCTIVE CONTROL
·EXECUET TERMINATION PHASE (TERMINATION OF VIDEO SIGNAL) IN ONE DISPLAY UNIT IN CONJUNCTION WITH ACTIVATION PHASE (START OF VIDEO SIGNAL) IN OTHER DISPLAY UNIT
AT THIS TIME, SET TIME FROM BACKLIGHT-OFF IN ONE DISPLAY UNIT TO DISPLAY-OFF AND TERMINATION OF VIDEO SIGNAL (IN OTHER WORDS, START OF VIDEO SIGNAL IN OTHER DISPLAY UNIT) TO $\Delta T2$ ⟋S6

THIRD CONJUNCTIVE CONTROL
·EXECUTE TERMINATION (ACTIVATION RESET) OF ONE DISPLAY UNIT IN CONJUNCTION WITH ACTIVATION (DISPLAY-ON STATE, BACKLIGHT-ON) OF OTHER DISPLAY UNIT SO THAT ACTIVATION OF OTHER DISPLAY UNIT IS PERFORMED EARLIER WITHOUT UNNECESSARY MARGIN, SET TIME FROM START OF VIDEO SIGNAL IN OTHER DISPLAY UNIT TO DISPLAY-ON STATE TO $\Delta T3$, SET TIME FROM DISPLAY-ON STATE TO BACKLIGHT-ON TO $\Delta T5$, AND THUS CONTROL OPERATION TIMING SUCH THAT DELAY TIME $\Delta T2 + \Delta T3 + \Delta T5$ IS ALWAYS INTERPOSED BETWEEN BACKLIGHT-OFF IN ONE DISPLAY UNIT AND BACKLIGHT-ON IN OTHER DISPLAY UNIT ⟋S7

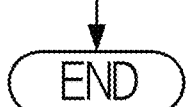

END

DISPLAY CONTROL DEVICE, DISPLAY DEVICE, AND DISPLAY CONTROL METHOD

CROSS-REFERENCE TO RELATED APPLICATIONS

This application claims the benefit of foreign priority to Japanese Patent Application No. 2024-071438 filed on Apr. 25, 2024, and Japanese Patent Application No. 2024-203629 filed on Nov. 22, 2024, the entire contents of each of which are hereby incorporated by reference.

TECHNICAL FIELD

The present invention relates to a display control device mounted on a vehicle such as an automobile, a display device, a display control method, and the like.

BACKGROUND ART

Patent Document 1 discloses a head-up display (HUD) device capable of displaying, through switching, a virtual image and a real image.

In Patent Document 1, a virtual image and a real image are switched by mechanically changing the mutual positional relationship among a liquid crystal panel (the object to be observed), a dihedral corner reflector array, and a reflective member (FIG. 12, [0050], etc.).

PRIOR ART DOCUMENT

Patent Document

Patent Document 1: Japanese Unexamined Patent Publication No. 2011-70074

SUMMARY OF INVENTION

Technical Problem

In the HUD device according to Patent Document 1, since a virtual image and a real image are switched by mechanical control, it takes a considerable amount of time for the switching.

The inventors of the present invention have studied electrical switching between images. By the electrical switching, the switching time can be shortened as compared with the mechanical switching. However, as a result of the above-described study, the following matters have become apparent.

(1) For example, it is assumed that a first display unit used for displaying a virtual image, which includes a first backlight, and a second display unit used for displaying a real image, which includes a second backlight, are provided and electrical switching control is performed to electrically select either the first display unit or the second display unit to be used.

(2) In this case, the current consumption increases when the display unit not in use is in an operating state, and therefore, in response to a request for low power consumption, it can be assumed that only the display unit in use is set to the operating mode and the display unit not in use, i.e., the display unit in a non-display state, is set to a non-operating mode, in which the current consumption is the lowest, and stands by.

However, with this configuration, when the display unit is switched, it is necessary to shift the display unit after the switching from the non-operating mode to the operating mode, and in this respect, a considerable delay occurs in the switching of the display unit to be used.

(3) Further, when the display unit to be used is switched, it is necessary to shift the display unit in use to a non-display state, and on the other hand, to shift the display unit currently not in use to a display state.

Here, for example, in a case where a delay occurs in the middle of the transition to the non-display state and a delay occurs in the turn-off of a backlight of the display unit in the middle of the transition, it can be assumed that the ON period of the backlight of the display unit in the middle of the transition overlaps the ON period of the backlight of the display unit in the middle of the transition to the display state.

In this case, both the real image and the virtual image are visually recognized by the viewer, and thus it is difficult to display an appropriate image.

(4) In order to suppress the above-described issue (3), it is preferable to provide a sufficient time margin between the processing for shifting the display unit in use to the non-display state and the processing for shifting the display unit currently not in use to the display state.

However, in this case, the display unit to be used cannot be quickly switched. In other words, although the electrical switching control has a potential to complete switching sufficiently early as compared with the related art, the potential cannot be fully utilized.

One object of the present invention is to shorten the time for switching when a virtual image and a real image are displayed by electrically controlling two display units to be switched.

Other objects of the present invention will become apparent to those skilled in the art by referring to the following aspects and best mode for carrying out the invention and the accompanying drawings.

Solution to Problem

Hereinafter, in order to easily understand the outline of the present invention, aspects according to the present invention will be exemplified.

First Aspect

In a first aspect according to the present invention, a display control device controls switching between a first image and a second image in a display device that includes a first image generation unit including a first light source unit and a first display unit and a second image generation unit including a second light source unit and a second display unit and is capable of displaying, through switching, the first image or the second image by using the first image generation unit or the second image generation unit through switching, and the display control device includes a control unit that, in a switching period when display by one image generation unit out of the first image generation unit and the second image generation unit is terminated and display by the other image generation unit is started, performs a parallel control in which a display start operation is performed in the other image generation unit in parallel with a display termination operation in the one image generation unit, performs a conjunctive control in which an operation timing of the other image generation unit is determined with an operation timing of the one image generation unit as a starting point, and performs an overlapping lighting suppression control that prevents, in the switching period, an ON period of the light source unit in the one image generation unit and an ON period of the light source unit in the other image generation unit from temporally overlapping each other in at least a partial period.

In the first mode, the parallel control, the conjunctive control, and the overlapping lighting suppression control are performed.

By the parallel control, the display termination operation of one display unit and the display start operation of the other display unit can be processed in parallel in a temporally overlapping manner, and thus the time for switching can be shortened.

Since the relative relationship between the timing of the display termination operation of one display unit and the timing of the display start operation of the other display unit is accurately maintained by the conjunctive control, the normal operation is maintained even when a timing deviation occurs, and stable switching control can be performed.

By the overlapping lighting suppression control, there is always a temporally non-overlapping period between the lighting period of the first light source unit and the lighting period of the second light source unit (a non-overlapping period of lighting of the light sources), and the two light source units are prevented from being simultaneously on during this period, which achieves the low power consumption.

According to the first aspect, it is possible to switch between a virtual image and a real image at a high speed while reliably preventing the images from being simultaneously displayed in the respective first and second display units and to suppress the power consumption.

Second Aspect

In a second aspect according to the first aspect, a control for terminating display by one image generation unit out of the first image generation unit and the second image generation unit and a control for starting display by the other image generation unit may be a sequence control for sequentially progressing the control in each of a plurality of phases in accordance with a predetermined order or procedure, and in the parallel control, a particular sequence is complete by execution of all the plurality of phases, but in a state where the sequence is stopped halfway through the phases, the display unit of the one image generation unit and the display unit of the other image generation unit may enter a low power consumption mode set to a current consumption lower than a current consumption during a normal operation. According to the second aspect, the sequence control is adopted as the control by the display control device, and in the sequence control, when the progress is stopped (interrupted) in the middle of phases among a plurality of phases, the display unit is set to a low power consumption mode (e.g., standby mode), and the power consumption is suppressed.

Therefore, according to the second aspect, when the operations of the two image generation units are caused to progress in parallel by the parallel control while achieving the low power consumption of the display unit, it is possible to perform advanced display switching control in which the progress is temporarily stopped and the operation is resumed after waiting for an appropriate timing.

Third Aspect

In a third aspect according to the first aspect, the control unit, in the conjunctive control, may set a predetermined time difference between an OFF timing of the display unit of the one image generation unit and an ON timing of the display unit of the other image generation unit and thus, in the overlapping lighting suppression control, may prohibit temporal overlapping between the ON period of the light source unit of the one image generation unit and the ON period of the light source unit of the other image generation unit.

According to the third aspect, it is possible to always provide a predetermined OFF period between the lighting period of one display unit and the lighting period of the other display unit so that the respective display units are reliably prevented from being simultaneously on. Therefore, it is possible to switch a virtual image and a real image at a high speed while reliably preventing the images from being simultaneously displayed on the respective display units.

In a fourth aspect according to the first aspect, the display control device may be mounted on a vehicle and allow a viewer who is an occupant of the vehicle to visually recognize a virtual image or a real image as an image through switching, the first display unit may be a display unit for virtual image display including a first backlight, the second display unit may be a display unit for real image display including a second backlight, the control unit may enable switching between the first display unit and the second display unit to be used, activation of the first display unit and the second display unit may be performed by an activation sequence, termination of display of the first display unit and the second display unit may be performed by a termination sequence, each of the activation sequence and the termination sequence may be a control for sequentially progressing each phase of the control in accordance with a predetermined order or procedure, the activation sequence may include a first activation phase to cancel reset of the first display unit and the second display unit, a second activation phase to start input of a video signal to the first display unit and the second display unit, a third activation phase to input a display-on command to the first display unit and the second display unit to set a display-on state, and a fourth activation phase to turn on the first backlight and the second backlight in the first display unit and the second display unit, the termination sequence may include a first termination phase to turn off the first backlight and the second backlight in the first display unit and the second display unit, a second termination phase to input a display-off command to the first display unit and the second display unit to set a display-off state, a third termination phase to terminate input of a video signal to the first display unit and the second display unit, and a fourth termination phase to reset the first display unit and the second display unit, in each of the activation sequence and the termination sequence, the sequence is complete by execution of all the phases, but in a state where the sequence is stopped halfway through the phases, the first display unit and the second display unit may enter a low power consumption mode set to a current consumption lower than a current consumption during the normal operation, and the control unit of the display control device may perform a first conjunctive control in which, when the first activation phase is executed by canceling reset for one display unit out of the first display unit and the second display unit, the first activation phase is started in parallel for the other display unit in conjunction with a start timing of the activation phase of the one display unit, may perform a second conjunctive control in which, when the second activation phase is executed by starting input of a video signal for one display unit out of the first display unit and the second display unit, the second activation phase is started in parallel for the other display unit in conjunction with an input start timing of a video signal or an input termination timing of the video signal in the one display unit, then, only in the one display unit, may execute the third activation phase by inputting the display-on command and the fourth activation phase by turning on one of the first backlight and the second backlight and thus start display of a video in the one display unit, and then, in a case where the first termination phase to the fourth termination phase are executed to terminate display in the one display unit displaying the video, in a termination period of the display, may perform a third conjunctive control in which, in the other display unit out of the first display unit and the second display unit, the third activation phase by inputting the display-on command and the fourth activation phase by turning on the other backlight out of the first backlight and the second backlight are executed in parallel such that a lighting period of one of the first backlight and the second backlight and a lighting period of the other of the first backlight and the second backlight do not overlap each other.

According to the fourth aspect, in the switching control of the first and second display units, in order to shorten the time for switching, the operations of the first and second display units are performed in parallel in a temporally overlapping manner.

In the case where the operations of the respective display units are performed in parallel while allowing the temporal overlap, the display unit that is currently not used for image display operates, and thus it is undeniable that the current consumption increases.

However, according to this aspect, the adopted sequence is designed such that, in each of the activation and termination sequences in each display unit, the sequence is completed by executing all the phases, but in a state where the sequence is stopped halfway through the phases, the first and second display units enter a low power consumption mode in which the current consumption is set to be lower than that during the normal operation.

Therefore, even when some phases of the sequence are executed in the display unit which is currently not used for image display, the current consumption becomes a low current consumption which is lower than the normal operation current, and therefore, the increase in the current consumption is small, and there is no particular problem.

According to this aspect, a "conjunctive control" is performed instead of an "individual control" for individually controlling the operation of each display unit in the related art.

The "conjunctive control" is a control in which the operation timing of one of the first and second display units is automatically determined in conjunction with the reference operation timing of the other display unit. In a case where the operation of each of the first and second display units is individually controlled, for example, even when a delay or the like occurs in the operation of one of the display units, the operation proceeds without taking the delay or the like into consideration in the other display unit; therefore, there may be disadvantages such that there is a mismatch between the operations of the respective display units and for example both the display units simultaneously display the images.

By performing the conjunctive control, even when the operation timing fluctuates in one of the display units, the fluctuation similarly occurs in the operation timing in the other display unit; therefore, the relative relationship between the operation timings of the respective display units, in other words, a temporal match is always maintained, and it is possible to reliably suppress the above-described disadvantages.

The conjunctive control performed in the present aspect includes first, second, and third conjunctive controls.

The "first conjunctive control" is conjunctive processing in which, when a first activation phase is executed by canceling the reset of one of the display units to set an operable state, the first activation phase is also performed by canceling the reset to set an operable state for the other display unit in conjunction with the timing (for example, simultaneously in synchronization or at a timing delayed by a predetermined time from the timing).

When the reset of one of the display units is canceled, the reset of the other display unit is also canceled to set an operable state, and therefore, the operations of the respective display units can be performed in parallel in a temporally overlapping manner.

The "second conjunctive control" is a conjunctive control in which, when a second activation phase is executed by starting the input of the video signal for one of the display units, the second activation phase is started in parallel for the other display unit in conjunction with the input start timing of the video signal or the input termination timing of the video signal in the one display unit.

By performing the second conjunctive control, the video signal is input to one of the display units and, in conjunction with it, the video signal is also input to the other display unit, and thus, the first and second activation phases, which are a premise when an image is displayed, are terminated for the other display unit. In other words, by the second conjunctive control, the other display unit can enter a standby state, waiting for third and fourth activation phases (input of the display-on command, lighting of the backlight).

The above-described "first and second conjunctive controls" are controls in which the "activation period" of one of the display units and the "activation period" of the other display unit temporally overlap each other and progress in parallel.

Next, "third conjunctive control" is performed.

The "third conjunctive control" is a control in which the "termination period" of one of the display units and the "activation period" of the other display unit temporally overlap each other and progress in parallel.

In other words, in the "third conjunctive control", when the display is terminated by executing the first to fourth termination phases in one of the display units displaying a video, in the termination period of the display, the third activation phase by inputting a display-on command and the fourth activation phase by turning on the other of the first backlight and the second backlight are executed in parallel in the other of the first display unit and the second display unit, and at this time, the conjunctive control is performed such that the lighting period of one of the first and second backlights and the lighting period of the other of the first and second backlights do not overlap each other.

As described above, the conjunctive control allows the operation timing of one of the display units to be in conjunction with the operation timing of the other display unit, and the mutual relationship (match) between the timings can be determined in advance, and by utilizing this advantage, it is possible to reliably avoid the simultaneous lighting of the first and second backlights (the simultaneous display of images by the displays).

Further, in the "third conjunctive control", as described above, since the simultaneous lighting of the first and second backlights can be avoided with reliability, it is possible to set the margin period for avoiding the simultaneous lighting to the minimum.

In other words, in the "third conjunctive control", the time margin for avoiding the simultaneous lighting may be minimized, and also in this respect, the switching of the display unit can be performed at a high speed. Therefore, according to this aspect, it is possible to switch the image display of the plurality of display units at a high speed while reliably suppressing the plurality of images from being simultaneously displayed by the electrical switching control.

In a fifth aspect according to the fourth aspect, in a case where, in the second conjunctive control, the second activation phase is executed to start input of a video signal in the other display unit out of the first display unit and the second display unit in conjunction with an input start timing of a video signal in one display unit out of the first display unit and the second display unit, the display control device, in the third conjunctive control, may execute the first termination phase in the one display unit out of the first display unit and the second display unit to turn off one of the first backlight and the second backlight at a first timing and subsequently executes the second termination phase at a second timing after elapse of a predetermined first delay time from the first timing to set a display-off state, and in the other display unit out of the first display unit and the second display unit, may execute the third activation phase at the first timing to set a display-on state and executes the fourth activation phase at the second timing to turn on the other of the first backlight and the second backlight.

The fifth aspect illustrates an example of the preferable control of the third conjunctive control in a case where, in the second conjunctive control, in conjunction with the "input start timing" of the video signal in one of the first and second display units, the input of the video signal is started by executing the second activation phase in the other of the first and second display units.

The termination sequence is executed in one of the display units. First, the first termination phase is executed, and one of the first and second backlights is turned off at a "first timing".

Subsequently, at a "second timing" with the elapse of a predetermined "first delay time" from the first timing, the second termination phase is executed to set a display-off state.

Conversely, in the other display unit, the third and fourth activation sequences are executed in parallel with the termination sequence of the one display unit.

At this time, at the above-described "first timing", the third activation phase is executed to set a display-on state.

Further, at the above-described "second timing", the fourth activation phase is executed to turn on the other of the first and second backlights.

Since the backlight is turned off at the "first timing" in one of the display units, there is no possibility that the two backlights are simultaneously on. Therefore, in the other display unit, at the "first timing", in other words, at the shortest timing without a redundant time margin, the third activation phase is performed in the other display unit to set the display-on state. As a result, the time for switching the display can be shortened.

Next, in the one display unit, the second termination phase is performed to set a display-off state at the "second timing" with the elapse of the "first delay time" from the "first timing".

At this time, in the other display unit, the fourth activation phase is performed to turn on the backlight at the above-described second timing. By this conjunctive control, at the second timing with the elapse of the first delay time from the first timing at which the backlight is turned off in one of the display units, the backlight is turned off in the other display unit, and the "first delay time" always exists between the turn-offs of the respective backlights, and therefore, the simultaneous lighting of the two backlights is prevented with reliability. This prevents the disadvantage that the two display units simultaneously operate to display images.

As described above, according to the second aspect, the time saving is realized by minimizing the time margin, and the third conjunctive control is performed such that the predetermined delay time (first delay time) is provided between the off timings of the two backlights.

Therefore, the termination processing of one of the display units and the activation processing of the other display unit can be performed in parallel without providing an unnecessary time, and the simultaneous lighting of the two backlights can be prevented with reliability.

In a sixth aspect according to the fourth aspect, in a case where, in the second conjunctive control, the second activation phase is executed in the other display unit out of the first display unit and the second display unit to start input of a video signal in conjunction with a timing at which input of a video signal is terminated in one display unit out of the first display unit and the second display unit, the display control device, in the third conjunctive control, may execute the first termination phase in the one display unit out of the first display unit and the second display unit to turn off one backlight out of the first backlight and the second backlight at a first timing and subsequently, at a second timing after elapse of a predetermined first delay time from the first timing, may execute the second termination phase and the third termination phase to set a display-off state and terminate the input of the video signal, and in the other display unit out of the first display unit and the second display unit, may execute the second activation phase to start input of a video signal at the second timing, may execute the third activation phase to set a display-on state at a third timing after elapse of a predetermined second delay time from the second timing, and may execute the fourth activation phase to turn on the other backlight out of the first backlight and the second backlight at a fourth timing after elapse of a predetermined third delay time from the third timing.

The sixth aspect describes an example of a preferable control of the third conjunctive control in a case where the second activation phase is executed to start the input of the video signal in the other of the first and second display units in conjunction with the "termination timing" of the video signal in one of the first and second display units in the second conjunctive control.

Also in the sixth aspect, the same conjunctive control as that in the second aspect described above is performed. However, according to this aspect, the input timing of the video signal to the other display unit is delayed as compared with the second aspect, and accordingly, there is no time margin, and it is difficult to perform a control until the backlight is turned on. In other words, it is necessary to take measures on the assumption that the timing of the video signal in the other display unit is delayed for some reason.

According to the third aspect, first, as in the second aspect, the first termination phase is executed in one of the display units, and one of the first and second backlights is turned off at the "first timing".

Subsequently, at a "second timing" with the elapse of a predetermined "first delay time" from the "first timing", the second and third termination phases are simultaneously executed to set the display-off state and to terminate the input of the video signal.

According to the second aspect described above, the video signal is input before the second timing, and only the second termination phase for setting the display-off state is performed at the second timing. In the third mode, the input of the video signal is also terminated at the second timing. This point is different from the second aspect.

In the other display unit, the input of the video signal is started in conjunction with the "second timing". In other words, the video signal is switched at the "second timing".

Subsequently, at a "third timing" with the elapse of a predetermined "second delay time" from the "second timing", the third activation phase is executed to set the display-on state, and subsequently, at a "fourth timing" with the elapse of a predetermined "third delay time" from the "third timing", the fourth activation phase is executed to turn on the other of the first and second backlights.

In the above-described conjunctive control, the "first delay time", the "second delay time", and the "third delay time" are interposed after the backlight in one of the display units is turned off at the first timing and before the backlight in the other display unit is turned on. In the second aspect described above, only the first delay time is provided; however, in this aspect, in consideration of an unexpected situation such as a delay occurring at the time of switching the video signal and for the sake of caution, the second and third delay times are further provided to prevent the two backlights from being simultaneously on.

Accordingly, in this aspect, the termination of the video signal for one of the display units and the start of the video signal for the other display unit can be performed at the same timing, the termination processing of one of the display units and the activation processing of the other display unit can be performed in parallel without providing an unnecessary time, and the simultaneous lighting of the two backlights can be prevented with reliability.

In a seventh aspect according to the sixth aspect, when an individual video signal is input to each of the first display unit and the second display unit, the display control device may supply the individual video signal via a common signal line and control a path of a selector connected to the common signal line by using a selection signal and thus determine which display unit out of the first display unit and the second display unit the video signal supplied via the common signal line is to be input to.

According to the seventh aspect, the signal line for supplying the video signal to each of the first and second display units can be shared, and the configuration for inputting the video signal to each display unit can be simplified.

The present invention is not limited to the aspects described above, and various modifications and applications are possible.

Eighth to twelfth aspects described below are examples of modifications and applications.

Eighth Aspect

In an eighth aspect according to the first aspect, in the overlapping lighting suppression control, the control unit may prohibit temporal overlapping between an ON period of the one light source unit and an ON period of the other light source unit, and perform full-black screen display processing to supply a black video signal to the display unit of the other image generation unit to set full-black screen display in a period from end of the ON period of the light source unit of the one image generation unit to start of the ON period of the light source unit of the other image generation unit.

In the eighth aspect, the ON periods of the two light sources are prohibited from temporally overlapping each other, while the two display units are each in a state capable of displaying an image during the non-overlapping period (OFF period), in other words, the display-on periods (the periods in which image display is possible) of the two display units temporally overlap each other.

Therefore, for example, a phenomenon may occur in which external light (sunlight, light from a lighting fixture, or the like) enters a housing of the display device and becomes stray light, and the screen of the display unit, which is supposed to be in a non-display state, becomes slightly bright due to the stray light. In this case, the viewer visually recognizes the two display units, which results in poor visibility.

In order to suppress this disadvantage, the full-black screen display processing is performed in the eighth aspect. In other words, a black video signal is supplied to the display unit, in which the display operation has started, the screen (image display region) of the display unit is displayed as a full-black screen, and the full-black display screen is used as a mask for blocking emission of unnecessary light, which suppresses the above-described disadvantage.

Ninth Aspect

In a ninth aspect according to the first aspect, in the overlapping lighting suppression control, the control unit may temporally overlap the ON period of the light source unit in the one image generation unit with the ON period of the light source unit in the other image generation unit in a partial period of the switching period, and perform full-black screen display processing to supply a black video signal to the display unit in the other image generation unit to set full-black screen display in at least a partial period of the switching period.

In the ninth aspect, the ON periods of the two light sources are allowed to partially overlap each other during the switching period.

During the switching period, each of the two display units is capable of displaying an image, and the lighting periods of the light sources overlap each other, and therefore, for example, there may be a case where some image is displayed on the screen of the display unit, which is supposed to be in a non-display state. In this case, the viewer visually recognizes the two display units, which results in poor visibility.

Therefore, in this aspect, the full-black screen display processing is performed on the display unit in which the display operation has started. In other words, by supplying a black video signal in at least a partial period of the switching period, the screen (image display region) of the display unit is displayed as a full-black screen, and the full-black display screen is used as a mask for blocking emission of unnecessary light so that the above-described disadvantage can be suppressed.

In a tenth aspect according to the ninth aspect, in parallel to the full-black screen display in the display unit of the other image generation unit, the control unit may perform moving image display for display termination in the display unit of the one image generation unit, and may cancel the full-black screen display in the other display unit and set normal image display in conjunction with termination of the moving image display for display termination.

In the tenth aspect, the ninth aspect (the aspect in which the ON periods of the two light sources are allowed to partially overlap each other during the switching period and the full-black screen display processing is performed on the display unit on which the processing for starting the image display is performed) is improved to realize the display switching which is more easily viewed and easily understood.

In other words, in the aspect, in the display unit where the display is to be terminated, for example, "moving image display for display termination (temporally continuous image display, which can also be referred to as animation display)" is performed, which can notify the viewer of the termination of the image display.

In the above-described eighth aspect, after the image display of one of the two display units is terminated, the image display of the other display unit is started after a predetermined period, and there is a blank period in which no image is displayed in any of the two display units during the display switching period.

Conversely, in the aspect, since a moving image (temporally continuous images) suitable for the notification of the termination is displayed on the display unit in which the image display is to be terminated, it is possible to realize switching that gives a more natural vision sense to the viewer. Further, in this aspect, the full-black screen display is canceled in conjunction with the termination of the moving image display for display termination, and the normal image display is performed. Thus, when the moving image display is terminated on one display unit, the normal display can be started on the other display unit, for example, without delay, and also in this respect, more natural and accurate switching is realized. Further, by actually using the display device, the viewer can empirically know that, when the moving image display for display termination is terminated in one display unit, the image display is started in the other display unit. Here, since the time from the start to the end of the moving image for display termination is determined, the viewer can predict how much time will elapse before image display on the other display unit is started; thus, a sense of security is increased. Therefore, it is possible to realize display switching which is more natural, accurate, provides a sense of security, and has desirable visibility.

In an eleventh aspect according to the tenth aspect, the moving image display for display termination may include image display for sliding out a displayed image, image display for fading out a displayed image, or image display for zooming out a displayed image.

The eleventh aspect describes a preferable example of the moving image display for display termination.

Slide-out is an image erasing method in which the position of the image being displayed is moved on the screen, and the image is gradually erased with the lapse of time.

Fade-out is an image erasing method of gradually erasing the image being displayed by gradually reducing the brightness (luminance) of the image on the screen with the lapse of time.

Zoom-out is an image erasing method of gradually erasing the image being displayed by gradually reducing the size of the image on the screen with the lapse of time.

By using these, the display of the image can be terminated without giving a sense of discomfort to a viewer.

In a twelfth aspect according to the ninth aspect, in at least a partial period of a period in which the full-black screen display is performed in the display unit of the other image generation unit, the control unit may perform light reduction processing to reduce a lighting intensity of the light source unit in the other image generation unit to be lower than a normal lighting intensity.

In the twelfth aspect, in the image generation unit on which the display is to be started, the display unit performs the full-black screen display, and the light source unit performs the processing to reduce the lighting intensity (light emission intensity) of the light source as compared with the normal state in at least a partial period of the period in which the full-black screen is displayed.

As described above, the full-black screen display has a function as a mask for blocking the emission of unnecessary light, and although the light emission of the light source is unnecessary at least in the period of the full-black screen, it takes time to turn on the light source again after the light source is turned off; thus, the light reduction processing is performed in this aspect. Thus, the power consumption can be further reduced (suppressed).

In a thirteenth aspect, a display device is mounted on a vehicle and allows a viewer who is an occupant of the vehicle to visually recognize a virtual image or a real image as an image through switching, and the display device includes a first display unit for virtual image display including a first backlight, a second display unit for real image display including a second backlight, and the display control device according to any one of the first aspect to the twelfth aspect.

According to the thirteenth aspect, it is possible to realize the display device capable of switching between the virtual image and the real image at a high speed while reliably preventing the images from being simultaneously displayed on the respective display units. Further, the power consumption can be effectively suppressed.

In a fourteenth aspect according to the thirteenth aspect, the display device may be a head-up display device that includes an emission window and emits display light generated by the first display unit or the second display unit through the emission window to allow the viewer to visually recognize a virtual image and a real image being an image represented by the display light.

According to the fourteenth aspect, it is possible to realize the head-up display device capable of switching between the virtual image and the real image at a high speed while reliably preventing the images from being simultaneously displayed on the respective display units. Further, the power consumption can be effectively suppressed.

In a fifteenth aspect, a display control method controls switching between a first image and a second image in a display device that includes a first image generation unit including a first light source unit and a first display unit and a second image generation unit including a second light source unit and a second display unit and is capable of displaying, through switching, the first image or the second image by using the first image generation unit or the second image generation unit through switching, and the display control method includes, in a switching period when display by one image generation unit out of the first image generation unit and the second image generation unit is terminated and display by the other image generation unit is started, performing a parallel control in which a display start operation is performed in the other image generation unit in parallel with a display termination operation in the one image generation unit, performing a conjunctive control in which an operation timing of the other image generation unit is determined with an operation timing of the one image generation unit as a starting point, and performing an overlapping lighting suppression control that prevents, in the switching period, an ON period of the light source unit in the one image generation unit and an ON period of the light source unit in the other image generation unit from tempo-rally overlapping each other in at least a partial period.

According to the fifteenth aspect, it is possible to realize the display control method capable of switching between the virtual image and the real image at a high speed while reliably preventing the images from being simultaneously displayed on the first and second display units and also suppressing the power consumption.

Those skilled in the art will readily appreciate that the aspects according to the present invention illustrated may be further modified without departing from the spirit of the present invention.

BRIEF DESCRIPTION OF DRAWINGS

FIGS. 4A and 4B are diagrams illustrating a configuration example of a lens and the like in a first display unit and a second display unit.

FIG. 6 is a timing chart illustrating an example of a conjunctive control by the display control device in FIG. 5.

FIG. 12 is a flowchart illustrating a main control procedure corresponding to the conjunctive control of FIG. 9.

DESCRIPTION OF EMBODIMENTS

The best embodiments described below are used for easy understanding of the present invention. Therefore, a person skilled in the art should note that the present invention is not unreasonably limited by the embodiments described below.

Overview of Each Embodiment

First, an outline of each of first to fifth embodiments of the present invention will be described with reference to FIGS. 1A to 1D.

FIGS. 1A to 1D are diagrams illustrating the outlines of the first to fifth embodiments of the present invention.

1. Overview of Configuration of Display Device

Figure 1:
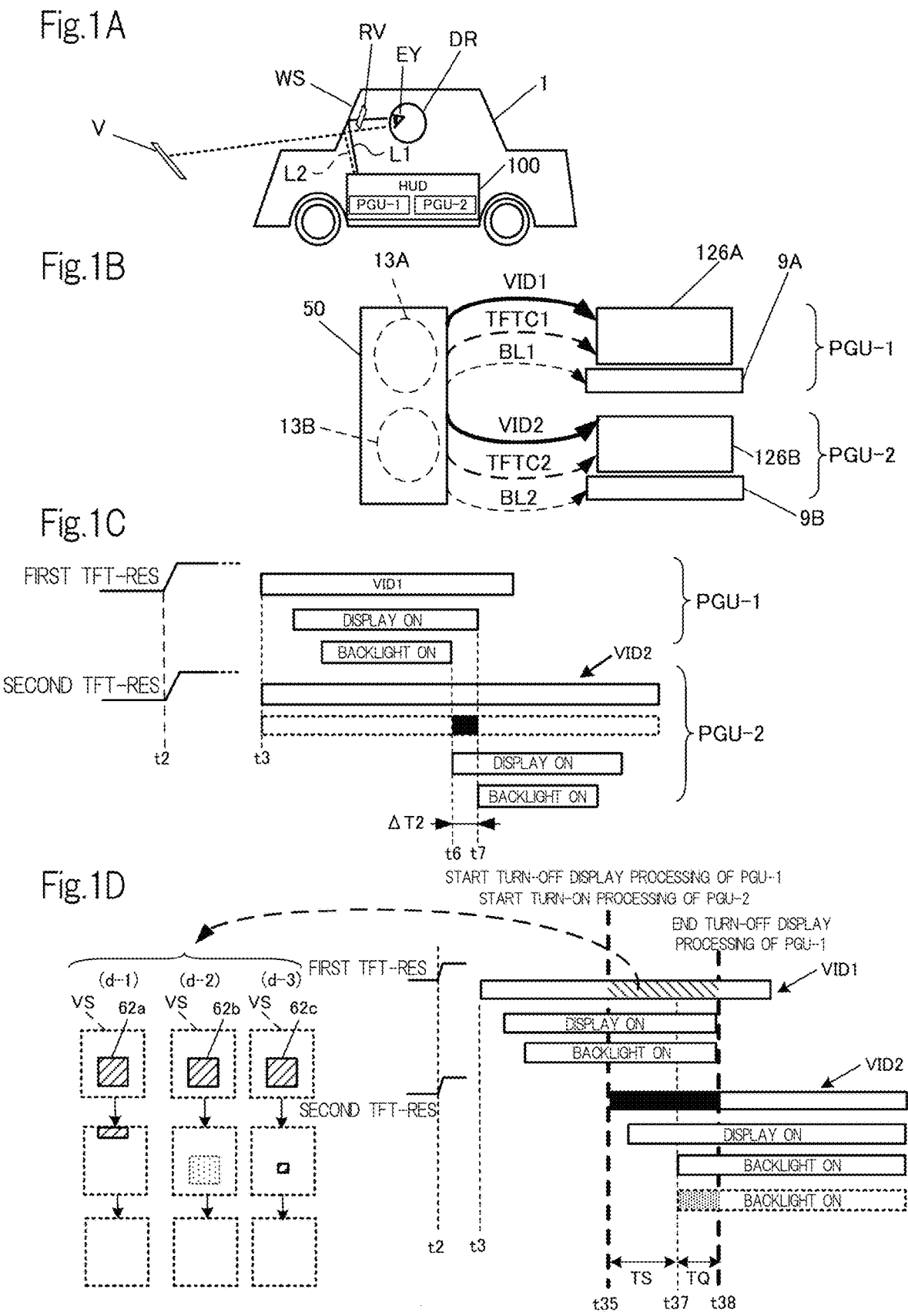
FIGS. 1A to 1D are diagrams illustrating outlines of a first embodiment to a fifth embodiment of the present invention.

FIG. 1A illustrates an example of a usage form of a display device (including a display control device) accord-ing to the present invention, and FIG. 1B illustrates an example of a basic (principle) configuration of the display device according to the present invention.

In the example of FIG. 1A, a head-up display (HUD) device 100 is mounted on a vehicle 1. The HUD device 100 includes a first image generation unit PGU-1 and a second image generation unit PGU-2.

When the first image generation unit PGU-1 is used, the display light travels via an optical path L1, and a part of the display light is reflected by a windshield WS included in the vehicle 1 and is incident on an eye (viewpoint) EY of a viewer DR who is an occupant (driver or the like). Thus, a real image RV is displayed. Similarly, when the second image generation unit PGU-2 is used, the display light travels via an optical path L2, and thus a virtual image V is displayed. By selecting any one of the first image generation unit PGU-1 and the second image generation unit PGU-2 to be used, the real image RV and the virtual image V can be switched and displayed.

As illustrated in FIG. 1B, a first control unit 13A provided in a display control device 50 controls an operation of the first image generation unit PGU-1, and a second control unit 13B controls an operation of the second image generation unit PGU-2.

The first image generation unit PGU-1 includes a first light source unit (first backlight) 9A and a first liquid crystal display unit (first liquid crystal panel) 126A. The second image generation unit PGU-2 includes a second light source unit (second backlight) 9B and a second liquid crystal display unit (second liquid crystal panel).

The first control unit 13A supplies a video signal (in other words, an image signal) VID1 and a control signal TFTC1 to the first liquid crystal display unit 126A and supplies a control signal BL1 to the first light source unit (first back-light) 9A.

The second control unit 13B supplies a video signal (in other words, an image signal) VID2 and a control signal TFTC2 to the second liquid crystal display unit 126B and supplies a control signal BL2 to the second light source unit (second backlight) 9B.

2. Overview of First Embodiment

Reference is made to FIG. 1C.

The first control unit 13A and the second control unit 13B of the display control device 50 perform a predetermined activation sequence and a predetermined termination sequence when the first image generation unit PGU-1 and the second image generation unit PGU-2 are activated and terminated.

In each of the activation and termination sequences, the sequence is complete by execution of all the phases, but in a state where the sequence is stopped halfway through the phases, the first liquid crystal display unit 126A and the second liquid crystal display unit 126B are designed to enter a low power consumption mode in which the current consumption is set to be lower than that during the normal operation so that the current consumption can be reduced.

"First TFT-RES and second TFT-RES" described on the left side of FIG. 1C are control signals for canceling the reset of the first image generation unit PGU-1 and the second image generation unit PGU-2, respectively. According to the first embodiment, when the first TFT-RES is set to the active level (H level) at a time t2, the second TFT-RES is also set to the active level in conjunction with (specifically, in synchronization with) the first TFT-RES, and thus the second image generation unit PGU-2 can be controlled in parallel with the control of the first image generation unit PGU-1.

In other words, in FIG. 1C, a "conjunctive control" and a "parallel control" are performed.

With regard to the first image generation unit PGU-1, the video signal (image signal) VID1 is supplied to the first liquid crystal display unit 126A at a time t3, then the first liquid crystal display unit 126A enters a display-on state (in other words, displayable state) after a predetermined time, and then the first backlight 9A is turned on after a predetermined time. Conversely, with respect to the second image generation unit PGU-2, the video signal (image signal) VID2 is supplied to the second liquid crystal display unit 126B at the time t3.

FIG. 1C illustrates the supply of the video signal (image signal) VID2 together with the supply mode indicated by a broken line, which is related to a third embodiment and therefore the description thereof is omitted here. Afterward, at a time t6, the second liquid crystal display unit 126B enters a display-on state (in other words, displayable state), and when a predetermined time ΔT2 elapses, the second backlight 9B is turned on. Since the second backlight 9B is turned on at the timing when the predetermined time ΔT2 has elapsed from the timing when the first backlight 9A is turned off, the turn-on of the first backlight 9A and the second backlight 9B does not temporally overlap, and thus, an increase in the power consumption due to the simultaneous lighting of the first backlight 9A and the second backlight 9B is suppressed. In other words, an "overlapping lighting suppression control" is performed to prevent the two backlights from being simultaneously on, and thus the power consumption is suppressed.

3. Overview of Second Embodiment

Figure 9:
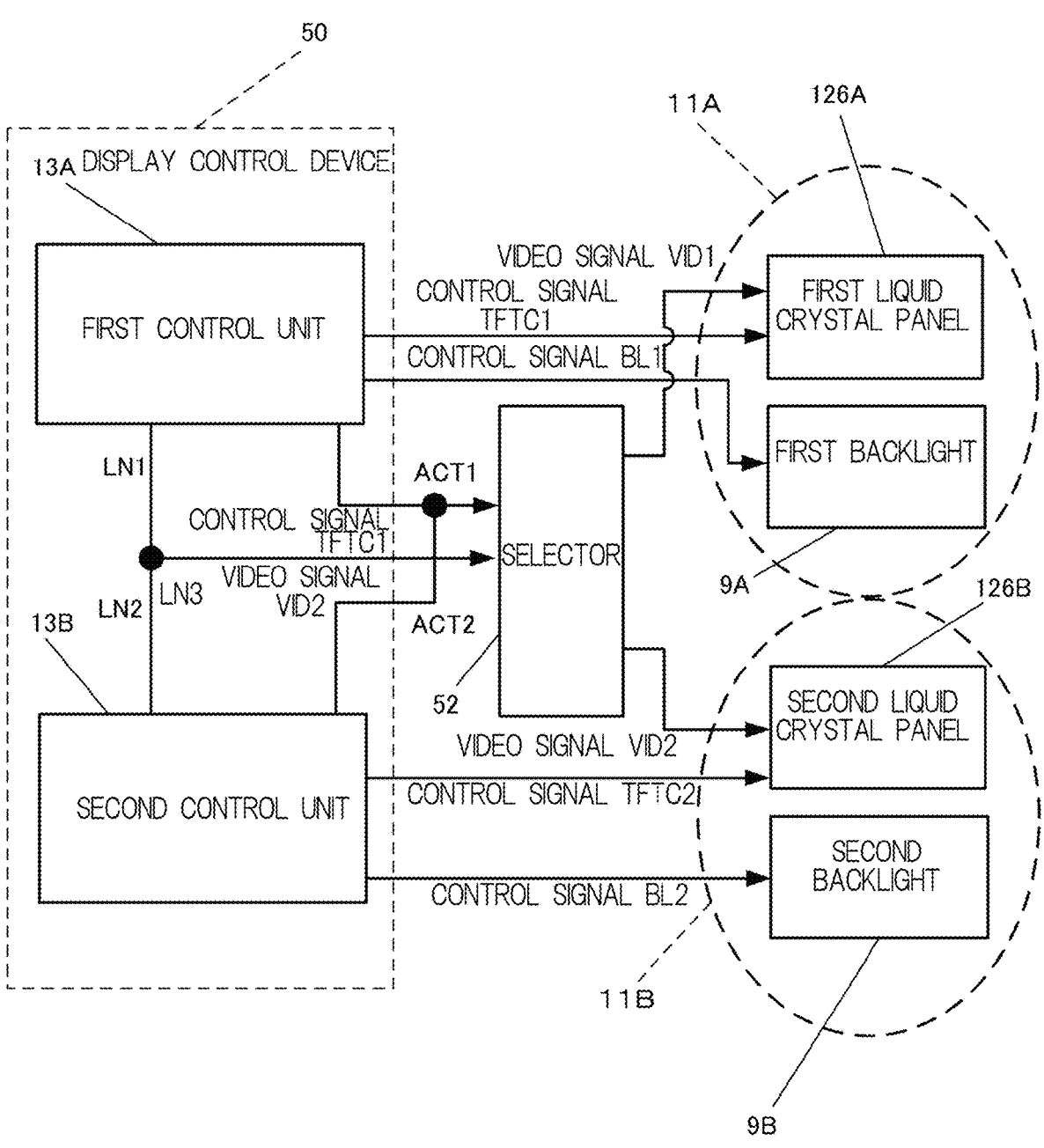
FIG. 9 is a diagram illustrating another example of the configuration of the display control device according to a second embodiment and another example of the display control by the display control device.

A second embodiment is not illustrated in FIGS. 1A to 1D for the sake of convenience, but its contents are illustrated in FIG. 9.

As illustrated in FIG. 9, according to the second embodiment, the supply lines of the first and second video signals (image signals) VID1 and VID2 are shared by using a selector so that the number of signal lines is reduced.

4. Overview of Third Embodiment

According to a third embodiment, with respect to the supply of the video signal (image signal) VID2 in FIG. 1C, the supply mode indicated by a broken line (the mode of supplying a black video signal) is adopted. For example, a phenomenon may occur in which external light (sunlight, light from a lighting fixture, or the like) enters a housing of the display device and becomes stray light, and the screen of the second liquid crystal display unit 126B, which is supposed to be in a non-display state, becomes slightly bright due to the stray light, and in this case, the viewer DR visually recognizes both the first liquid crystal display unit 126A and the second liquid crystal display unit 126B, which results in poor visibility. To prevent this phenomenon, according to the third embodiment, a black video signal is supplied in the video signal (image signal) VID2 in at least the period of the time t6 to t7 (the period of ΔT2), and thus the screen (image display region) of the second liquid crystal display unit 126B is set to full-black screen display.

The full-black display screen functions as a mask for blocking the emission of unnecessary light, thereby making it possible to suppress the above-described disadvantage.

5. Overview of Fourth Embodiment

According to a fourth embodiment, as illustrated in FIG. 1D, the ON periods of the two light sources are allowed to partially overlap each other during the switching period (see a period TQ from a time t37 to a time t38 in FIG. 1C).

Further, full-black screen display processing is performed on the second liquid crystal display unit 126B of the second image generation unit PGU-2 in which the image display is to be started (see the switching period (the period of TS+TQ) at a time t35 to a time t38 in FIG. 1D). The full-black screen display may be performed in at least a partial period of the switching period. In this case, in particular, in the period in which the ON periods of the backlights of the respective display units overlap each other (the period TQ from the time t37 to the time t38), it is preferable to perform the full-black screen display in order to reliably prevent an unnecessary image from being displayed on the second liquid crystal display unit 126B.

Further, in the first liquid crystal display unit 126A where the display is to be terminated, for example, in the switching period (the period from the time t35 to the time t38 in FIG. 1D), "moving image display for display termination (temporally continuous image display, which can also be referred to as animation display)" is performed, which can notify the viewer of the termination of the image display. This achieves natural image deletion without a sudden feeling.

In FIG. 1D, the video signal (image signal) VID1 in the moving image display period is hatched.

For example, a slide-out (the reference numeral d-1), a fade-out (the reference numeral d-2), a zoom-out (the reference numeral d-3), and the like, illustrated on the left side of FIG. 1D can be assumed as the type of deletion of the display by the moving image.

In the example of FIG. 1D, the slide-out is a method of gradually deleting an image 62a by moving the position of the displayed image 62a over time on a virtual display surface VS (see FIG. 2) on which the virtual image V is displayed.

In the example of FIG. 1D, the fade-out is a method of gradually deleting an image 62b by reducing the brightness of the displayed image 62b over time on the virtual display surface VS (see FIG. 2) on which the virtual image V is displayed.

In the example of FIG. 1D, the zoom-out is a method of gradually deleting an image 62c by reducing the size of the displayed image 62c over time on the virtual display surface VS (see FIG. 2) on which the virtual image V is displayed.

In the example of FIG. 1D, the full-black screen display is canceled in conjunction with the termination timing of the moving image display for display termination (the time t38 in FIG. 1D), and the normal image display is set. As a result, when the moving image display on one display unit is terminated, for example, the normal display can be started on the other display unit without delay, and also in this respect, more natural switching is achieved.

By actually using the HUD device 100, the viewer DR can empirically know that, when the moving image display for display termination is terminated in one display unit (the first liquid crystal display unit 126A in FIG. 1D), the image display is started in the other display unit (the second liquid crystal display unit 126B in FIG. 1D).

Here, since the time from the start to the end of the moving image for display termination (the period from the time t35 to the time t38 in FIG. 1D) is determined, the viewer DR can predict how much time will elapse before image display on the other display unit is started; thus, a sense of security is increased. Therefore, it is possible to realize display switching which is more natural, provides a sense of security, and is excellent in visibility.

6. Overview of Fifth Embodiment

According to a fifth embodiment, with respect to the turn-on of the second light source unit (backlight) 9B in FIG. 1D, the mode indicated by a broken line is adopted.

According to the fifth embodiment, in the image generation unit on which the display is to be started (the second image generation unit PGU-2 in the example of FIGS. 1A to 1D), the second display unit 11B performs full-black screen display, and the second light source unit (backlight) 9B performs processing to reduce the lighting intensity (light emission intensity) of the backlight as compared with the normal state in at least a partial period (the period TQ from the time t37 to the time t38 in which the two backlights are on in an overlapping manner in FIG. 1D) of the period in which the full-black screen is displayed.

In FIG. 1D, the period in which the light reduction processing is performed in the ON period of the backlight is shaded.

The full-black screen display has a function as a mask for blocking emission of unnecessary light, and light emission of the light source is not necessary at least in the period of the full-black screen; however, when the light source is turned off, it takes time to turn on the light source again, and therefore, the light reduction processing is performed. Thus, the power consumption can be further reduced (suppressed).

The above is the overview of each of the first to fifth embodiments.

Each embodiment will be described below in detail with reference to FIGS. 2 to 8.

First Embodiment

Figure 2:
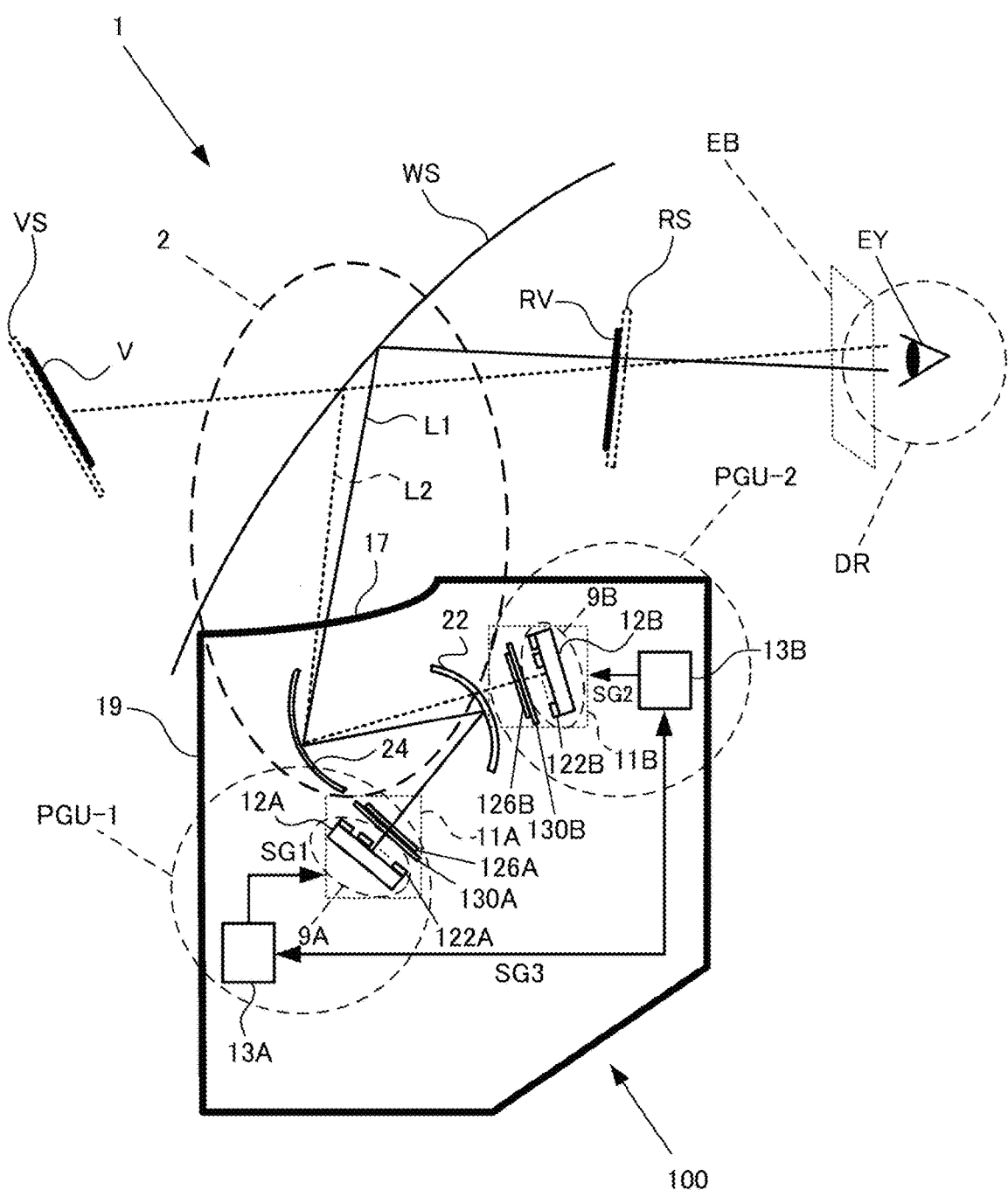
FIG. 2 is a diagram illustrating an example of a configuration of a head-up display device as a display device according to an embodiment of the present invention.

Reference is made to FIG. 2. FIG. 2 is a diagram illustrating an example of a configuration of a head-up display device as the display device according to an embodiment of the present invention.

The head-up display (HUD) device 100 mounted on the vehicle 1 includes the first image generation unit PGU-1 (picture generation unit (PGU)), the second image generation unit PGU-2, and an optical system 2, provided inside a housing 19 including an emission window 17.

The first image generation unit PGU-1 includes a first display unit 11A and the first control unit (display control unit) 13A.

The second image generation unit PGU-2 includes a second display unit 11B and the second control unit (display control unit) 13B.

The first display unit 11A includes the first light source unit, i.e., the first backlight 9A, and the first liquid crystal display unit (first liquid crystal panel) 126A formed on a circuit substrate 130A.

The second display unit 11B includes the second light source unit 9B, i.e., the second backlight 9B, and the second liquid crystal display unit (second liquid crystal panel) 126B formed on a circuit substrate 130B.

The first light source unit (first backlight) 9A includes a light-source circuit substrate 12A and a plurality of light emitting elements (light emitting diodes (LEDs) or the like) 122A formed on the light-source circuit substrate 12A. The second light source unit (second backlight) 9B includes a light-source circuit substrate 12B and a plurality of light emitting elements (LEDs or the like) 122B formed on the light-source circuit substrate 12B. Configuration examples of lenses and the like in the first light source unit 9A and the second light source unit 9B will be described below.

The first control unit 13A uses a control signal SG1 to control operations of the first light source unit (first backlight) 9A and the first liquid crystal display unit (liquid crystal panel) 126A in the first display unit 11A. The second control unit 13B uses a control signal SG2 to control operations of the first light source unit (first backlight) 9B and the second liquid crystal display unit 126B in the second display unit 11B.

Figure 5:
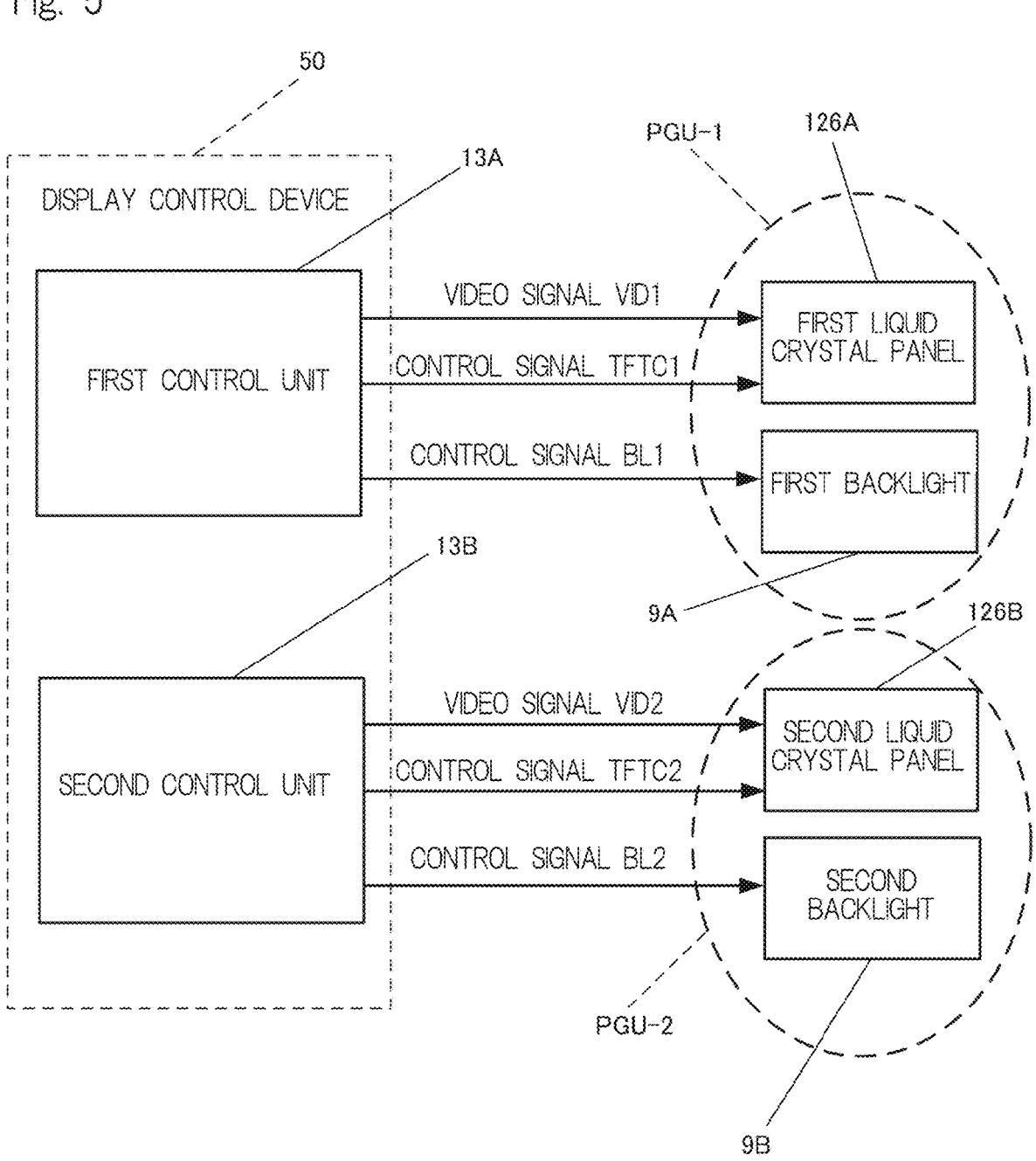
FIG. 5 is a diagram illustrating an example of a configuration of a display control device according to a first embodiment and an example of display control by the display control device.

The first control unit 13A and the second control unit 13B form a display control device (not illustrated in FIG. 2, the reference numeral 50 in FIG. 5).

Further, the first control unit 13A and the second control unit 13B use a control signal SG3, or the like, to communicate with each other and can perform the conjunctive control described below.

The optical system 2 includes, as constituent elements, a first curved mirror having light reflectivity and transmissivity (i.e., a curved lens having light reflectivity and transmissivity) 22 and a second curved mirror (concave mirror or the like) 24 that reflects light. A windshield WS serving as a projection target member of the vehicle 1 may be included as a constituent element of the optical system 2.

In the drawing, the optical path L1 indicated by a solid line indicates a representative optical path (main path along the optical axis) of display light of an image generated by the first display unit 11A included in the first image generation unit PGU-1.

The display light generated by the first display unit 11A is emitted through the emission window 17 of the HUD device 100, passes through the optical path L1, and is incident on the eye (viewpoint) EY of the viewer DR, who is an occupant (driver or the like) of the vehicle 1, at the position of an eyebox EB.

As a result, the image generated by the first display unit 11A is visually recognized as the real image RV on a virtual real-image display surface RS.

In the drawing, the optical path L2 indicated by a broken line indicates a representative optical path (main path along the optical axis) of display light of an image generated by the second display unit 11B included in the second image generation unit PGU-2.

The display light generated by the second display unit 11B is emitted through the emission window 17 of the HUD device 100, passes through the optical path L2, and is incident on the eye (viewpoint) EY of the viewer DR, who is an occupant (driver or the like) of the vehicle 1, at the position of the eyebox EB.

As a result, the image generated by the second display unit 11B is visually recognized as the virtual image V on the virtual virtual-image display surface VS.

Figure 3:
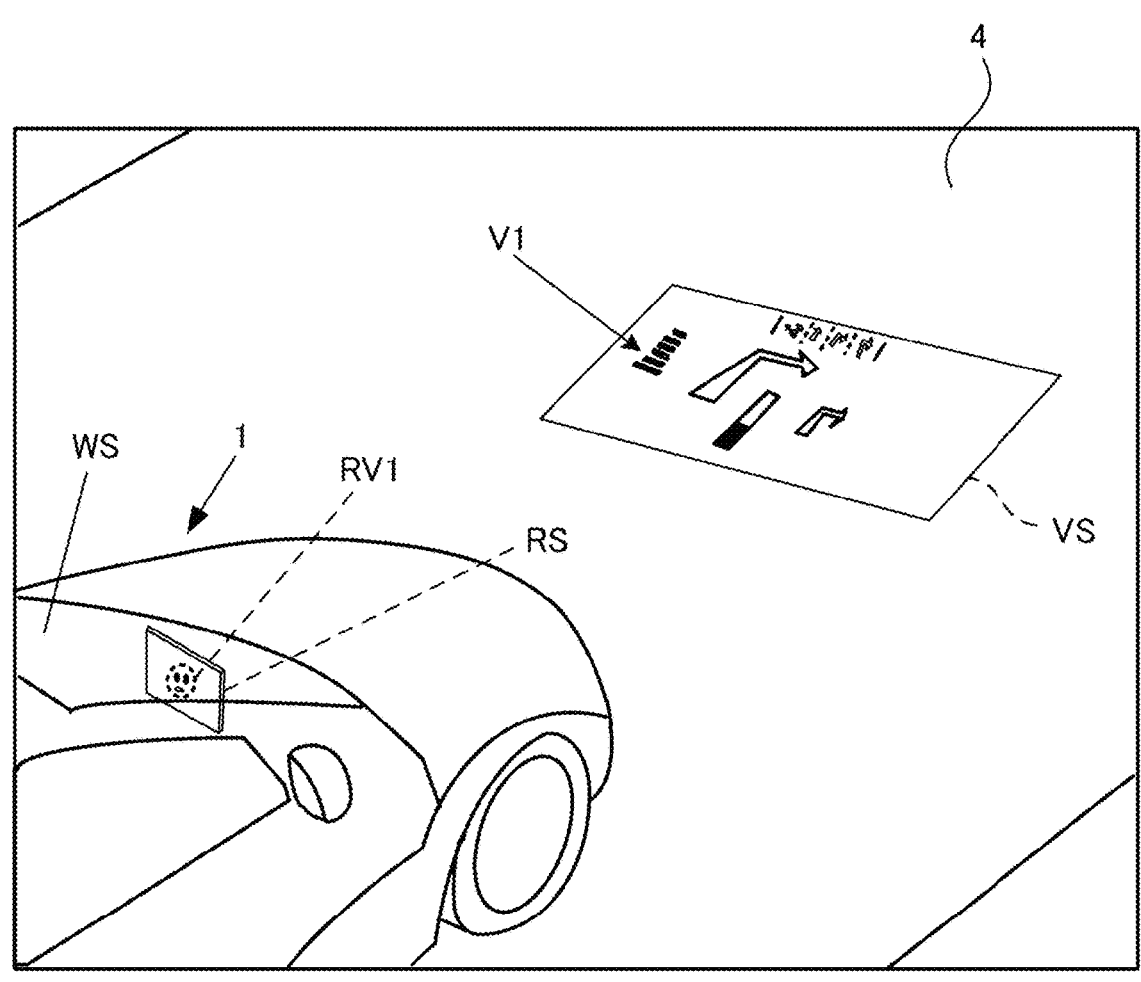
FIG. 3 is a diagram illustrating an example of virtual image display and an example of real image display by head-up display.

Reference is now made to FIG. 3. FIG. 3 is a diagram illustrating an example of virtual image display and an example of real image display by the head-up display. In FIG. 3, the same components as those in FIG. 2 are denoted by the same reference numerals.

In FIG. 3, the vehicle 1 is traveling on a road surface 4. During this traveling period, for example, a virtual image V1 such as a road sign can be displayed on the virtual virtual-image display surface VS inclined at a predetermined angle with respect to the road surface 4.

For example, a real image RV1 of a guide icon for guiding a traveling route or the like can be displayed on the virtual real-image display surface RS inside the vehicle 1, i.e., inside the windshield WS.

According to the present embodiment, the switching between the virtual image V1 and the real image RV1 is performed by electrical control, and the parallel control and the plurality of conjunctive controls are adopted so that it is possible to achieve high-speed switching while preventing the images from temporally overlapping each other.

Reference is now made to FIGS. 4A and 4B. FIGS. 4A and 4B are diagrams illustrating configuration examples of a lens and the like in each of the first display unit and the second display unit. In FIGS. 4A and 4B, the same components as those in the above-described drawings are denoted by the same reference numerals.

FIG. 4A illustrates an example of a lens structure of the first display unit 11A. The first display unit 11A includes the light-source circuit substrate 12A, the plurality of light emitting elements (LEDs or the like) 122A formed on the light-source circuit substrate 12A, a condenser lens 123A, a first lenticular lens 124A for the first display unit, a second lenticular lens 125 for the first display unit, a diffusion plate 127A, and the first liquid crystal display unit (liquid crystal panel) 126A.

The emission surface of the second lenticular lens 125 is a convex toroidal surface. By forming the emission surface in a convex shape, the light distribution characteristics can be narrowed in both the H direction and the V direction.

The display light generated by the first display unit 11A travels along the optical path L1 passing through the first curved mirror (curved lens) 22, the second curved mirror 24 (not illustrated in FIG. 4A), and the windshield WS and reaches the eyebox EB. As a result, the real image RV is displayed.

FIG. 4B illustrates an example of a lens structure of the second display unit 11B. The second display unit 11B includes the light-source circuit substrate 12B, the plurality of light emitting elements (LEDs or the like) 122B formed on the light-source circuit substrate 12B, a condenser lens 123B, a first lenticular lens 124B for the second display unit, a second lenticular lens 129, a diffusion plate 127B, and the second liquid crystal display unit (liquid crystal panel) 126B.

The emission surface of the second lenticular lens 129 is a concave toroidal surface. By forming the emission surface in a concave shape, the light distribution characteristics can be widened in both the H direction and the V direction.

The display light generated by the second display unit 11B travels along the optical path L2 passing through the first curved mirror (curved lens) 22, the second curved mirror 24 (not illustrated in FIG. 4A), and the windshield WS and reaches the eyebox EB. As a result, the virtual image V is displayed.

Reference is now made to FIG. 5. FIG. 5 is a diagram illustrating an example of a configuration of the display control device and an example of a display control performed by the display control device.

The display control device (or display device) 50 includes the first control unit 13A and the second control unit 13B. The display control device 50 (the first control unit 13A and the second control unit 13B) is a controller that controls the first display unit 11A and the second display unit 11B and includes a processor formed by an electronic circuit (hardware) that performs a predetermined function by executing a program (software). That is, the display control device 50 may be configured by various processors such as a CPU, an MPU, a GPU, a DSU, an FPGA, and an ASIC. The display control device 50 may include one or more processors.

The first control unit 13A supplies the video signal VID1 and the control signal TFTC1 to the first liquid crystal panel (first liquid crystal display unit) 126A, which is included in the first display unit 11A and uses a thin film transistor (TFT), and supplies the control signal BL1 to the first backlight (first light source unit) 9A.

The second control unit 13B supplies the video signal VID2 and the control signal TFTC2 to the second liquid crystal panel (second liquid crystal display unit) 126B, which is included in the second display unit 11B and uses a TFT, and supplies the control signal BL2 to the second backlight (second light source unit) 9B.

The display control device 50 performs a predetermined activation sequence and a predetermined termination sequence when the first display unit 11A and the second display unit 11B are activated and terminated.

The above-described control signals "TFTC1, TFTC2, BL1, and BL2" are collective terms and, to be more specific, a plurality of types of control signals is used. This point will be described below.

Each of the activation sequence and the termination sequence is a control for sequentially advancing each phase of the control in accordance with a predetermined order or procedure, and the activation sequence includes a first activation phase for canceling the reset of the first display unit 11A and the second display unit 11B, a second activation phase for starting the input of a video signal to the first display unit 11A and the second display unit 11B, a third activation phase for inputting a display-on command to the first display unit 11A and the second display unit 11B to set a display-on state, and a fourth activation phase for turning on the first backlight 9A and the second backlight 9B in the first display unit 11A and the second display unit 11B.

The termination sequence includes a first termination phase for turning off the first backlight 9A and the second backlight 9B in the first display unit 11A and the second display unit 11B, a second termination phase for inputting a display-off command to the first display unit 11A and the second display unit 11B to set a display-off state, a third termination phase for terminating the input of the video signal to the first display unit 11A and the second display unit 11B, and a fourth termination phase for resetting the first display unit 11A and the second display unit 11B.

In each of the activation and termination sequences described above, the sequence is complete by execution of all the phases, but in a state where the sequence is stopped halfway through the phases, the first display unit 11A and the second display unit 11B are designed to enter a low power consumption mode in which the current consumption is set to be lower than that during the normal operation so that the current consumption can be reduced.

Figure 6:
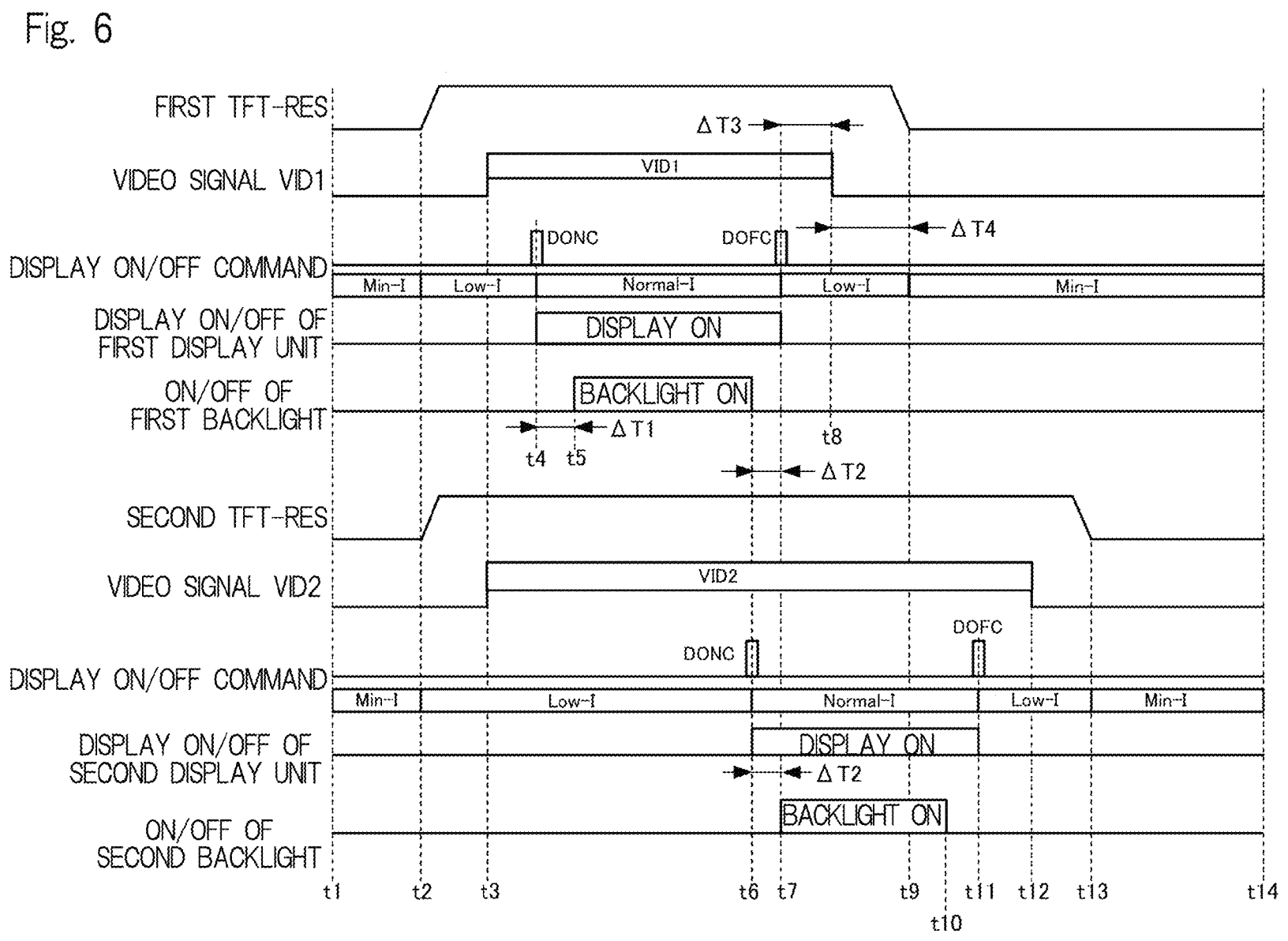
Figure 7:
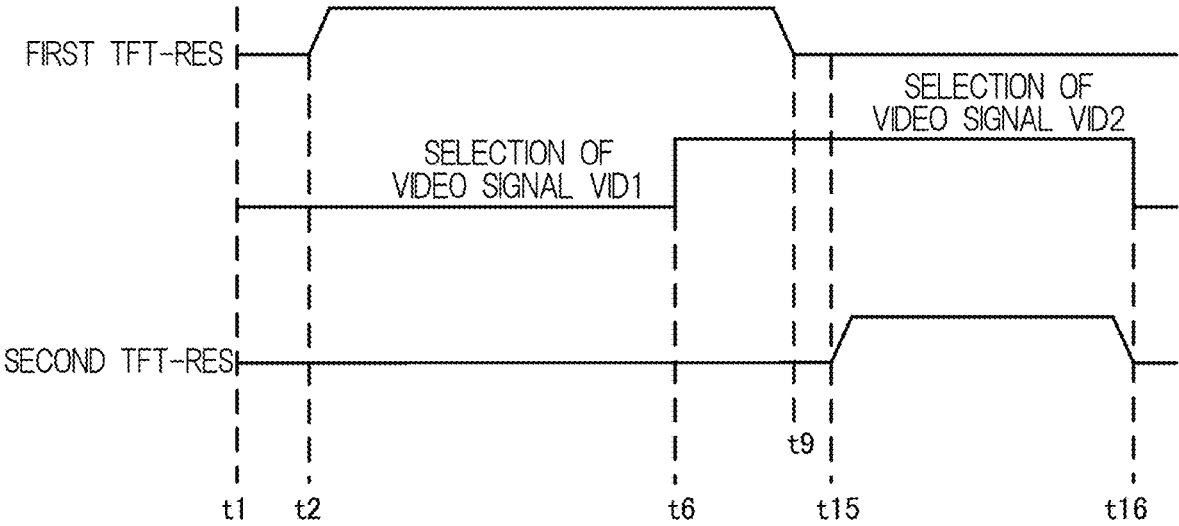
FIG. 7 is a timing chart according to a comparative example with respect to FIG. 6.

Reference is now made to FIGS. 6 and 7. FIG. 6 is a timing chart illustrating an example of the conjunctive control by the display control device in FIG. 5. FIG. 7 is a timing chart according to a comparative example with respect to FIG. 6.

First, the comparative example (an example in which the display control according to the present invention is not used) of FIG. 7 will be referred to. In FIG. 7, at a time t1, "the first TFT-RES and the second TFT-RES which are control signals for canceling the reset" supplied to the first liquid crystal panel 126A and the second liquid crystal panel 126B, respectively, are both at the L level (i.e., inactive level).

At a time t2, the first TFT-RES becomes the H level (i.e., active level), and the reset of the first liquid crystal panel 126A in the first display unit 11A is canceled to set an operable state. Afterward, at a time t9, the first TFT-RES becomes the L level (inactive level), and the display in the first display unit 11A is terminated.

Subsequently, at a time t15, the second TFT-RES, which is a control signal, becomes the H level (active level), and the reset of the second liquid crystal panel 126B in the second display unit 11B is canceled to set an operable state. Afterward, at a time t16, the second TFT-RES becomes the L level (inactive level), and the display in the second display unit 11B is terminated.

In the example of FIG. 7, since the display operation of the second display unit 11B is started after the display operation of the first display unit 11A is terminated, it is undeniable that the switching time of the display becomes long.

Therefore, in the display control according to the present embodiment illustrated in FIG. 7, the processing of one of the first display unit 11A and the second display unit 11B and the processing of the other display unit temporally overlap each other and are performed in parallel so that the display switching can be performed at a high speed.

However, in the individual control in which each processing is separately performed, when a delay occurs in one processing, the other processing progresses without noticing the delay, which increases, for example, the possibility that the first backlight 9A and the second backlight 9B are simultaneously on. When the parallel processing is performed, the first display unit 11A and the second display unit 11B enter an operating state, and thus it is undeniable that the power consumption (current consumption) also increases.

According to the present embodiment, with regard to the issue of an increase in the power consumption (current consumption), as described above, the activation and termination sequences are designed such that, when the sequence is stopped halfway through the phases, a standby mode is set to maintain a low-power consumption state, so that an increase in the power consumption is minimized.

Conversely, to avoid the risk of simultaneous display due to the parallel processing, three conjunctive controls (first, second, and third conjunctive controls) are continuously performed.

Here, unlike the "individual control", the "conjunctive control" is a timing control method in which one operation timing is determined in conjunction with the other operation timing, and there is an effect that, when one timing is determined, the other timing is automatically determined.

Therefore, when a delay occurs in one timing, the other timing is similarly delayed, so that the relative time relationship between one timing and the other timing is always maintained as designed. Therefore, the first backlight 9A and the second backlight 9B can be prevented from being simultaneously on with reliability.

In this way, it is possible to completely shorten the time by minimizing an unnecessary margin (margin for avoiding overlap) while preventing the backlights from being simultaneously on with reliability, and thus it is possible to safely and greatly shorten the switching time as compared with the related art.

The above-described "first conjunctive control" is processing in which, when the first activation phase is executed by canceling the reset for one of the first display unit 11A and the second display unit 11B, the first activation phase (reset cancel) is started in parallel for the other display unit in conjunction with the start timing of the activation phase of the one display unit (to be specific, may be at the same time or when a predetermined time elapses from the start timing as a starting point).

According to a preferred embodiment, the above-described "second conjunctive control" is, for example, "processing in which, when the input of the video signal is started to execute the second activation phase for one of the first display unit 11A and the second display unit 11B, the second activation phase (input of the video signal) is started in parallel for the other display unit in conjunction with the input start timing of the video signal or the input termination timing of the video signal in the one display unit".

Afterward, the third activation phase (display-on state) by inputting the display-on command and the fourth activation phase (backlight-on) by turning on one of the first backlight 9A and the second backlight 9B are executed only in one of the display units, and thus the display of the video in the one display unit is started.

The above-described "third conjunctive control" is processing in which, when the display is then terminated by performing the first to fourth termination phases (display-off state, backlight off, stop of the video signal, and reset) described above in the one display unit displaying the video, for example, the third activation phase (display-on state) by the input of the display-on command and the fourth activation phase (backlight-on) for turning on the other of the first and second backlights are performed in parallel during the termination period of the display in the other of the first display unit 11A and the second display unit 11B such that the lighting period of one of the first backlight 9A and the second backlight 9B does not overlap with the lighting period of the other of the first backlight 9A and the second backlight 9B. The "third conjunctive control" may include an input phase of a video signal in the other display unit (for example, in the case of FIGS. 9 and 10). This point will be described below.

The timing control illustrated in FIG. 6 will be described below in order. The terms "Min-I", "Normal-I", and "Low-I" in the drawings mean "minimum operating current", "normal operating current in the normal operation mode", and "low current consumption in the low power consumption mode", respectively.

Further, "DONC" is a display-on command (a display-on command for setting a display-on state), and "DOFC" is a display-off command (a display-off command for setting a display-off state).

In FIG. 6, at the time t1, "the first TFT-RES and the second TFT-RES which are control signals for canceling the reset" supplied to the first liquid crystal panel 126A and the second liquid crystal panel 126B are both at the L level (i.e., inactive level).

At the time t2, the first TFT-RES becomes the H level (i.e., active level), and the reset of the first liquid crystal panel 126A in the first display unit 11A is canceled to set an operable state. In conjunction with the timing of the change of the first TFT-RES to the H level (simultaneously in synchronization in the example of FIG. 5), the second TFT-RES also becomes the H level (active level) (first conjunctive control).

Next, at the time t3, the video signal VID1 is supplied to the first display unit 11A. The video signal VID2 is also supplied to the second display unit 11B in conjunction with the timing of supplying the video signal (simultaneously in synchronization in FIG. 5) (second conjunctive control).

Next, at a time t4, the display-on command DONC is input to the first display unit 11A, and thus the first display unit 11A enters a display-on state. Subsequently, at a time t5 with the elapse of a predetermined time ΔT1 from the time t3, the first backlight 9A is turned on, and the display of an image in the first display unit 11A is started.

Afterward, at the time t6, the first backlight 9A is turned off. At a time t7 with the elapse of a predetermined first delay time ΔT2 from the time t6, the display-off command DOFC is input, and thus the first display unit 11A enters a display-off state. Subsequently, at a time t8 with the elapse of a predetermined time ΔT3 from the time t7, the input of the video signal VID1 is terminated, and then at a time t9 with the elapse of a predetermined time ΔT4 from the time t8, the first TFT-RES is set to the L level (inactive level), and the first display unit 11A enters a reset state.

Conversely, in the second display unit 11B, at the time t6, the display-on command DONC is input, and thus the second display unit 11B enters a display-on state. Subsequently, at the time t7 with the elapse of the above-described first delay time ΔT2 from the time t6, the second backlight 9B is turned on, and the display of an image on the second display unit 11B is started (third conjunctive control).

Then, at a time t10, the second backlight 9B is turned off, and at a time t11, the display-off command DOFC is input, and thus the second display unit 11B enters a display-off state. Afterward, at a time t12, the input of the video signal VID2 is terminated, and subsequently, at a time t13, the second TFT-RES is set to the L level (inactive level), and the first display unit 11A enters a reset state. At a time t14, the first display unit 11A and the second display unit 11B enter a non-display state.

As described above, since the first backlight 9A is turned off at the time t6 (first timing) in the period of the third conjunctive control, there is no possibility that the first backlight 9A and the second backlight 9B are simultaneously on. Thus, in the second display unit 11B, it is possible to set the display-on state at the above-described time t6 (first timing), in other words, at the shortest timing without a redundant time margin, and thus it is possible to shorten the time for switching the display.

In the second display unit 11B, the second backlight 9B is turned on at the time t7 (second timing) with the elapse of the first delay time ΔT2 from the time t6 (first timing).

By this conjunctive control, the second backlight 9B in the second display unit 11B is turned on at the time t7 (second timing) with the elapse of the first delay time ΔT2 from the time t6 (first timing) at which the first backlight 9A is turned off in the first display unit 11A, and the "first delay time ΔT2" is always present between the turn-offs of the first backlight 9A and the second backlight 9B, and therefore, the simultaneous lighting of the first backlight 9A and the second backlight 9B is prevented with reliability. This prevents the disadvantage that the first display unit 11A and the second display unit 11B simultaneously operate to display an image.

As described above, with the display control of FIG. 6, it is possible to shorten the time by minimizing the time margin, and the third conjunctive control is performed such that the predetermined delay time (first delay time) ΔT2 is provided between the off timings of the first backlight 9A and the second backlight 9B.

Therefore, the termination processing of the first display unit 11A and the activation processing of the second display unit 11B can be performed in parallel without providing an unnecessary time, and the simultaneous lighting of the first backlight 9A and the second backlight 9B can be prevented with reliability.

Figure 8:
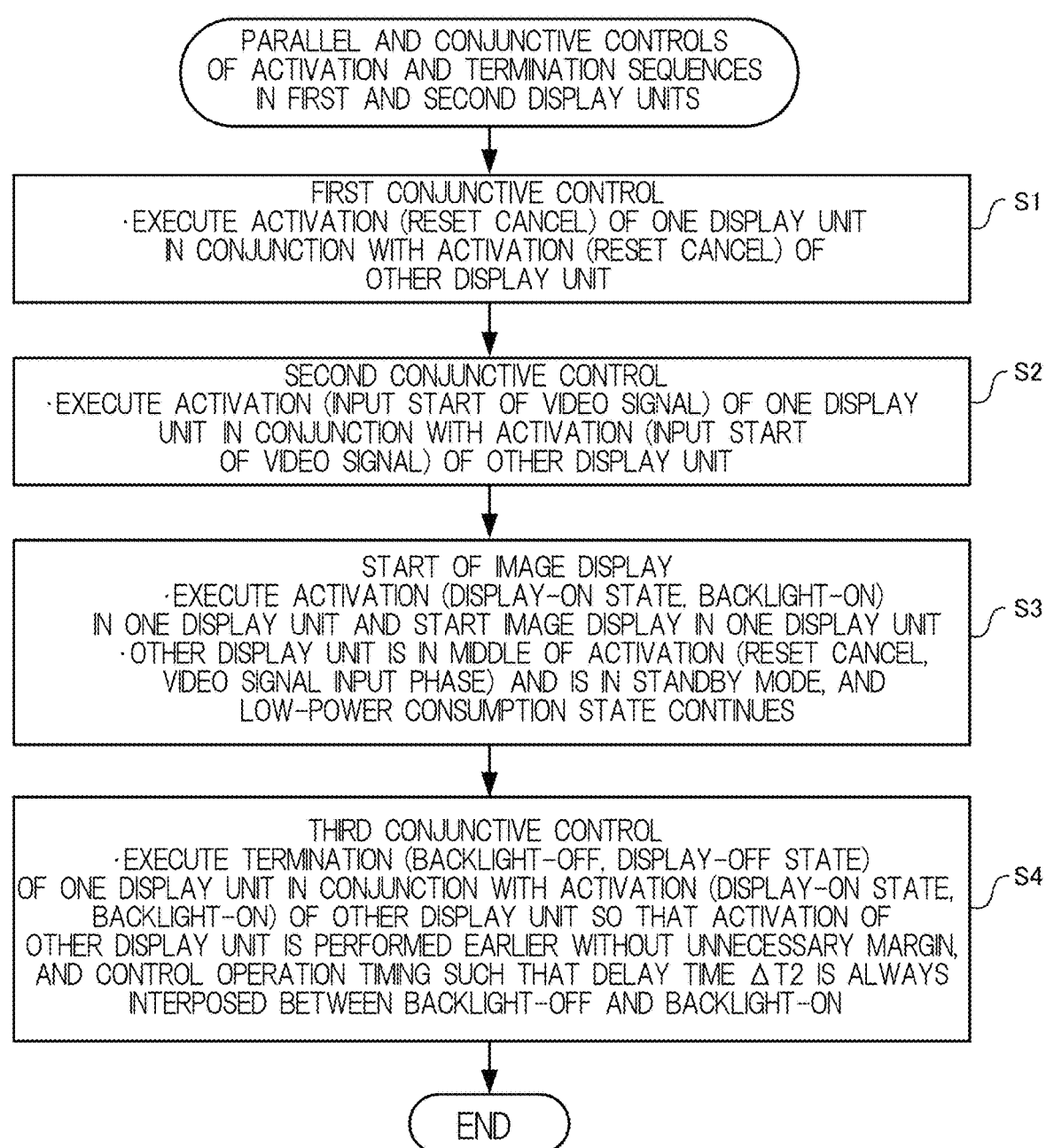
FIG. 8 is a flowchart illustrating a main control procedure corresponding to the conjunctive control of FIG. 6.

Reference is now made to FIG. 8. FIG. 8 is a flowchart illustrating a main control procedure corresponding to the conjunctive control of FIG. 6.

As described above, in the example of FIG. 6, the parallel and conjunctive controls (the first to third conjunctive controls) of the activation and termination sequences are performed in the first and second display units.

In step S1, the first conjunctive control is performed. In step S1, the activation (reset cancel) of one of the display units is executed in conjunction with the activation (reset cancel) of the other display unit.

In step S2, the second conjunctive control is performed. In step S2, the activation (input start of a video signal) of one of the display units is executed in conjunction with the activation (input start of a video signal) of the other display unit.

Subsequently, in step S3, image display is started in either one of the display units. In step S3, the activation (display-on state, backlight-on) is executed in one of the display units, and image display is started in the one display unit. At this time, since the other display unit is in the middle of activation (reset cancel, video signal input phase) and is in the standby mode, the low-power consumption state continues, and an increase in power consumption does not particularly become an issue.

Subsequently, in step S4, the third conjunctive control is performed. In step S3, the termination (backlight-off, display-off state) of the one display unit is executed in conjunction with the activation (display-on state, backlight-on) of the other display unit so that the activation of the other display unit is performed earlier without an unnecessary margin, and the operation timing is controlled such that the delay time (first delay time) ΔT2 is always interposed between the backlight-off of one of the display units and the backlight-on of the other.

Second Embodiment

Reference is made to FIG. 9. FIG. 9 is a diagram illustrating another example of the configuration of the display control device and another example of the display control performed by the display control device. In FIG. 9, the same components as those in FIG. 5 are denoted by the same reference numerals.

The basic configuration and operation of the display device of FIG. 9 are the same as those of the display device of FIG. 5. In other words, the display control device (or the display device) 50 includes the first control unit 13A and the second control unit 13B. The first control unit 13A supplies the video signal VID1 and the control signal TFTC1 to the first liquid crystal panel (first liquid crystal display unit) 126A, which is included in the first display unit 11A and uses a TFT, and supplies the control signal BL1 to the first backlight (first light source unit) 9A.

The second control unit 13B supplies the video signal VID2 and the control signal TFTC2 to the second liquid crystal panel (second liquid crystal display unit) 126B, which is included in the second display unit 11B and uses a TFT, and supplies the control signal BL2 to the second backlight (second light source unit) 9B.

The display control device 50 performs a predetermined activation sequence and a predetermined termination sequence when the first display unit 11A and the second display unit 11B are activated and terminated.

In FIG. 9, the two video signals VID1 and VID2 are supplied via a common signal line, and a selector 52 is appropriately switched so that the video signal VID1 is supplied to the first liquid crystal panel 126A and the video signal VID2 is supplied to the second liquid crystal panel 126B, which is different from the drawing in this respect.

In FIG. 9, a signal line LN1 for supplying the video signal VID1 and a signal line LN2 for supplying the video signal VID2 are connected to a common signal line LN3 at a common connection point. The video signals VID1 and VID2 are supplied (transmitted) to the selector 52 via the common signal line LN3.

The first control unit 13A supplies an output-destination switching control signal ACT1 to the selector 52 at an appropriate timing in the switching period of the video signal and, similarly, the second control unit 13B supplies an output-destination switching control signal ACT2 to the selector 52 at an appropriate timing in the switching period of the video signal.

The path of the selector 52, i.e., the output destination (the supplying destination or the switching destination) of the video signals VID1 and VID2 are controlled to be switched by the output-destination switching control signals ACT1 and ACT2, and thus the video signals VID1 and VID2 are supplied to the first liquid crystal panel 126A and the second liquid crystal panel 126B, respectively.

With this configuration, the signal lines for supplying video signals are shared (unified). Therefore, the configuration for supplying the video signals VID1 and VID2 to the first display unit 11A and the second display unit 11B is simplified.

Figure 10:
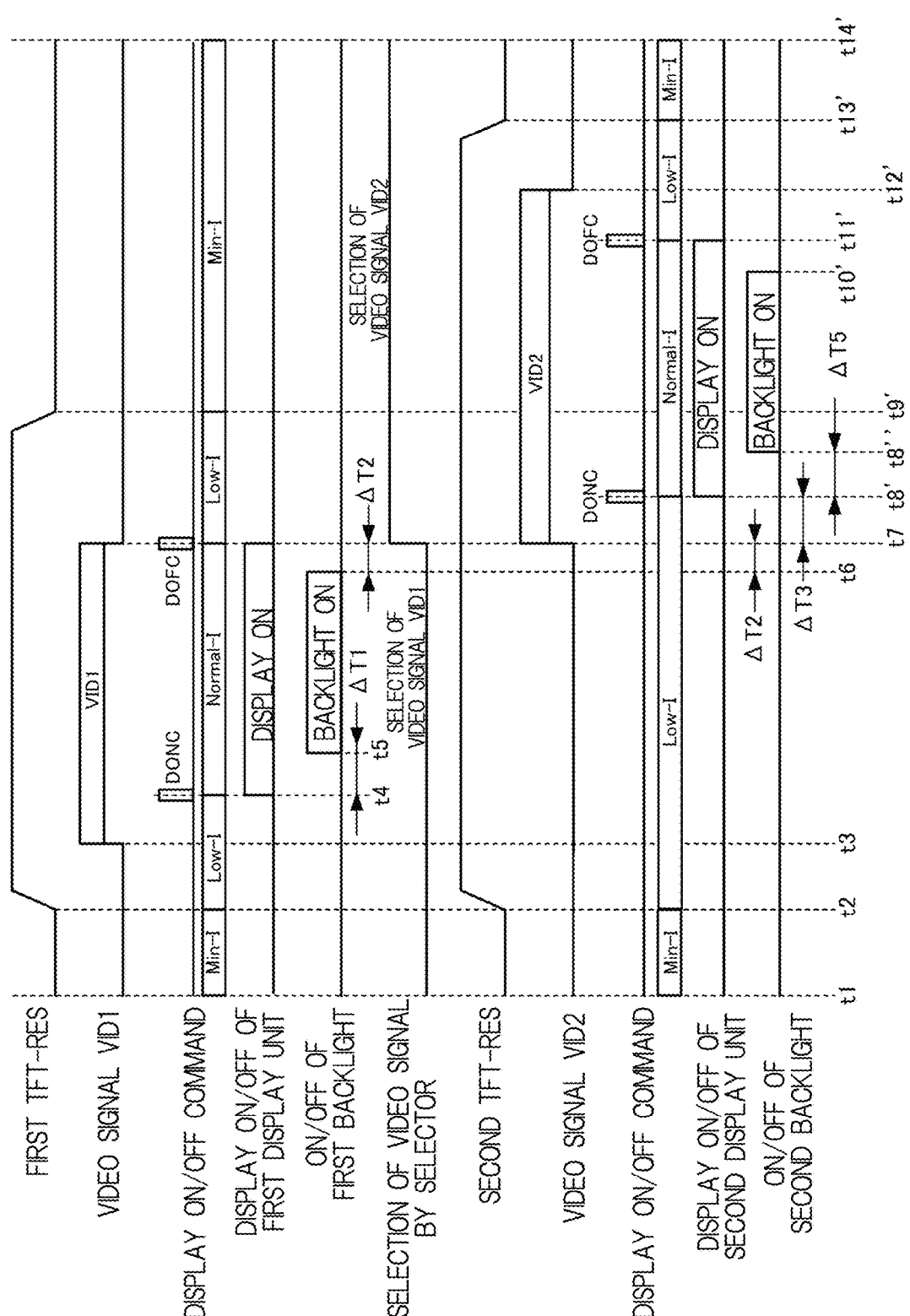
FIG. 10 is a timing chart illustrating an example of a conjunctive control by the display control device in the example of FIG. 9.
Figure 11:
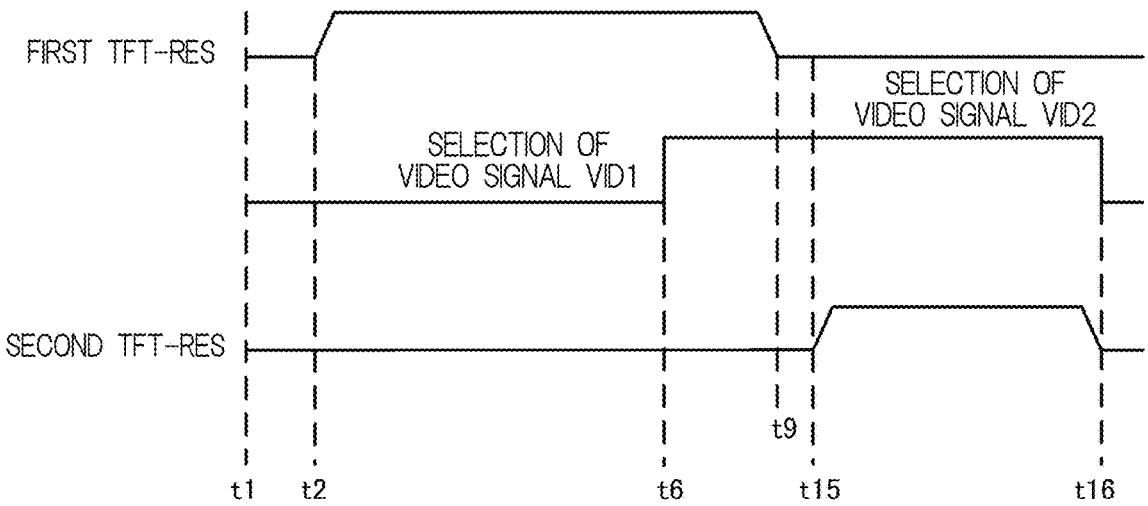
FIG. 11 is a timing chart according to a comparative example with respect to FIG. 10.

Next, FIGS. 10 and 11 will be referred to. FIG. 10 is a timing chart illustrating an example of the conjunctive control performed by the display control device in the example of FIG. 9. FIG. 11 is a timing chart according to a comparative example with respect to FIG. 10.

First, the comparative example (an example in which the display control according to the present invention is not used) of FIG. 11 is referred to. In FIG. 11, the timings of "the first TFT-RES and the second TFT-RES which are control signals for canceling the reset" supplied to the first liquid crystal panel 126A and the second liquid crystal panel 126B, respectively, are the same as those in the example of FIG. 7.

In other words, also in the example of FIG. 11, since display operation of the second display unit 11B is started after the display operation of the first display unit 11A is terminated, it is undeniable that the display switching time becomes long.

However, FIG. 11 is different from FIG. 7 in that the times t2 to t6 are the input period of the video signal VID1, the supply of the video signal VID2 is started at the time t6, and the times t6 to t16 are the input period of the video signal VID2.

In the example of FIG. 11, since the input timing of the video signal VID2 is later than that in the example of FIG. 7, and therefore when the input timing of the video signal VID2 is delayed for some reason, the first backlight 9A and the second backlight 9B may be simultaneously on. Therefore, when the configuration illustrated in FIG. 11 is adopted, it is necessary to take a more careful measure in consideration of the possibility of the delay of the input timing of the video signal VID2.

Reference is made to FIG. 10. The operation at the times t1 to t7 in FIG. 10 is the same as that in FIG. 6 described above except for the part related to the input of the video signal.

In the example of FIG. 10, only the video signal VID1 is input to the first display unit 11A at the time t3. The video signal VID2 is input to the second display unit 11B at the time t7.

In other words, in the example of FIG. 10, in the second conjunctive control, the input of the video signal VID2 in the second display unit 11B is started in conjunction with the time t7 which is the "termination timing" of the video signal VID1 in the first display unit 11A.

Therefore, the input timing of the video signal VID2 to the second display unit 11B is delayed as compared with the example of FIG. 6 described above, and accordingly, there is no time margin, and it is difficult to perform a control until the second backlight 9B is turned on. In other words, it is necessary to take measures on the assumption that the timing of the video signal VID2 in the second display unit 11B is delayed for some reason.

In the example of FIG. 10, the first backlight is turned off at the time t6 (first timing) in the first display unit 11A, as in the example of FIG. 6 described above.

At the time t7 (second timing) with the elapse of the predetermined first delay time ΔT2 from the time t6, the input of the display-off command DOFC and the stop of the video signal VID1 are simultaneously performed in the first display unit 11A. Thus, the first display unit 11A enters a display-off state, and the video signal VID1 is also stopped at the same time.

In the second display unit 11B, the input of the video signal VID2 is started in conjunction with the time t7 (second timing). In other words, the video signals VID1 and VID2 are switched at the time t7 (second timing).

The processing for switching the video signals VID1 and VID2 at the time t7 (second timing) belongs to the second conjunctive processing described above, but can also be referred to as start processing of the third conjunctive processing performed subsequently to the second conjunctive processing, and therefore may be included in the third conjunctive processing.

Subsequently, at a time t8' (third timing) with the elapse of the predetermined "second delay time ΔT3" from the time t7 (second timing), the display-on command DONC is input to the second display unit 11B, and the display-on state is set.

Then, at a time t8" (fourth timing) with the elapse of a predetermined "third delay time ΔT5" from the time t8' (third timing), the second backlight 9B is switched on (turned on).

According to the above-described conjunctive control, after the first backlight 9A in the first display unit 11A is turned off at the time t6 (first timing), the "first delay time ΔT2", the "second delay time ΔT3", and the "third delay time ΔT5" are interposed until the second backlight 9B in the second display unit 11B is turned on.

In the example of FIG. 6, only the first delay time ΔT2 is provided; however, in the example of FIG. 10, in consideration of an unexpected situation such as a delay occurring at the time of switching the video signal and for the sake of caution, the second delay time ΔT3 and the third delay time ΔT5 are further provided as a measure of preventing the first backlight 9A and the second backlight 9B from being simultaneously on.

Accordingly, in the example of FIG. 10, the termination of the video signal VID1 for the first display unit 11A and the start of the video signal VID2 for the second display unit 11B can be simultaneously performed at the same timing (the time t7 as the second timing), the termination processing of the first display unit 11A and the activation processing (start of image display) of the second display unit 11B can be performed in parallel without providing an unnecessary time, and the simultaneous lighting of the first backlight 9A and the second backlight 9B can be prevented with reliability by providing many delay times.

Reference is now made to FIG. 12. FIG. 12 is a flowchart illustrating a main control procedure corresponding to the conjunctive control of FIG. 10. In FIG. 12, the steps common to those in FIG. 8 are denoted by the same reference numerals.

First, in step S1, the first conjunctive control is performed. In step S1, as described above, the activation (reset cancel) of one of the display units is executed in conjunction with the activation (reset cancel) of the other display unit.

In step S5, image display is started in the second display unit 11B. In step S5, the activation processing (input of a video signal, display-on state, and backlight-on) is executed in one of the display units, and thus image display is started in the one display unit. Conversely, the other display unit is in the middle of activation (reset cancel phase) and in the standby mode, and the low-power consumption state continues.

In step S6, the second conjunctive control is performed. In step S6, the termination phase (termination of the video signal) in one of the display units is executed in conjunction with the activation phase (start of the video signal) in the other display unit. At this time, the time from backlight-off in one of the display units to display-off and termination of the video signal (in other words, the start of the video signal in the other display unit) is set to the first delay time ΔT2.

In step S7, the third conjunctive control is performed. In step S7, the termination (activation reset) of one of the display units is executed in conjunction with the activation (display-on state, backlight-on) of the other display unit so that the activation of the other display unit is performed earlier without an unnecessary margin, the time from the start of the video signal in the other display unit to the display-on state is set to ΔT3, the time from the display-on state to the backlight-on is set to ΔT5, and thus the operation timing is controlled such that "the first delay time ΔT2+the second delay time ΔT3+the third delay time ΔT5" is always interposed between the backlight-off in one of the display units and the backlight-on in the other display unit.

As described above, according to the embodiment of the present invention, it is possible to realize the display control device, the display device such as a head-up display, and the display control method, with which it is possible to switch between the virtual image and the real image at a high speed while providing the period in which the images are not simultaneously displayed on the respective display units. Further, the power consumption can be effectively suppressed.

The present invention is not limited to the above-described embodiments, and various modifications and applications are possible. For example, according to the above-described embodiment, the windshield is used as the projection target member (translucent member); however, the projection target member is not limited thereto, and a flat glass or a combiner may be used.

The present invention is not limited to the exemplary embodiments described above, and a person skilled in the art can easily modify the exemplary embodiments described above to the extent that they fall within the scope of the claims.

Figure 13:
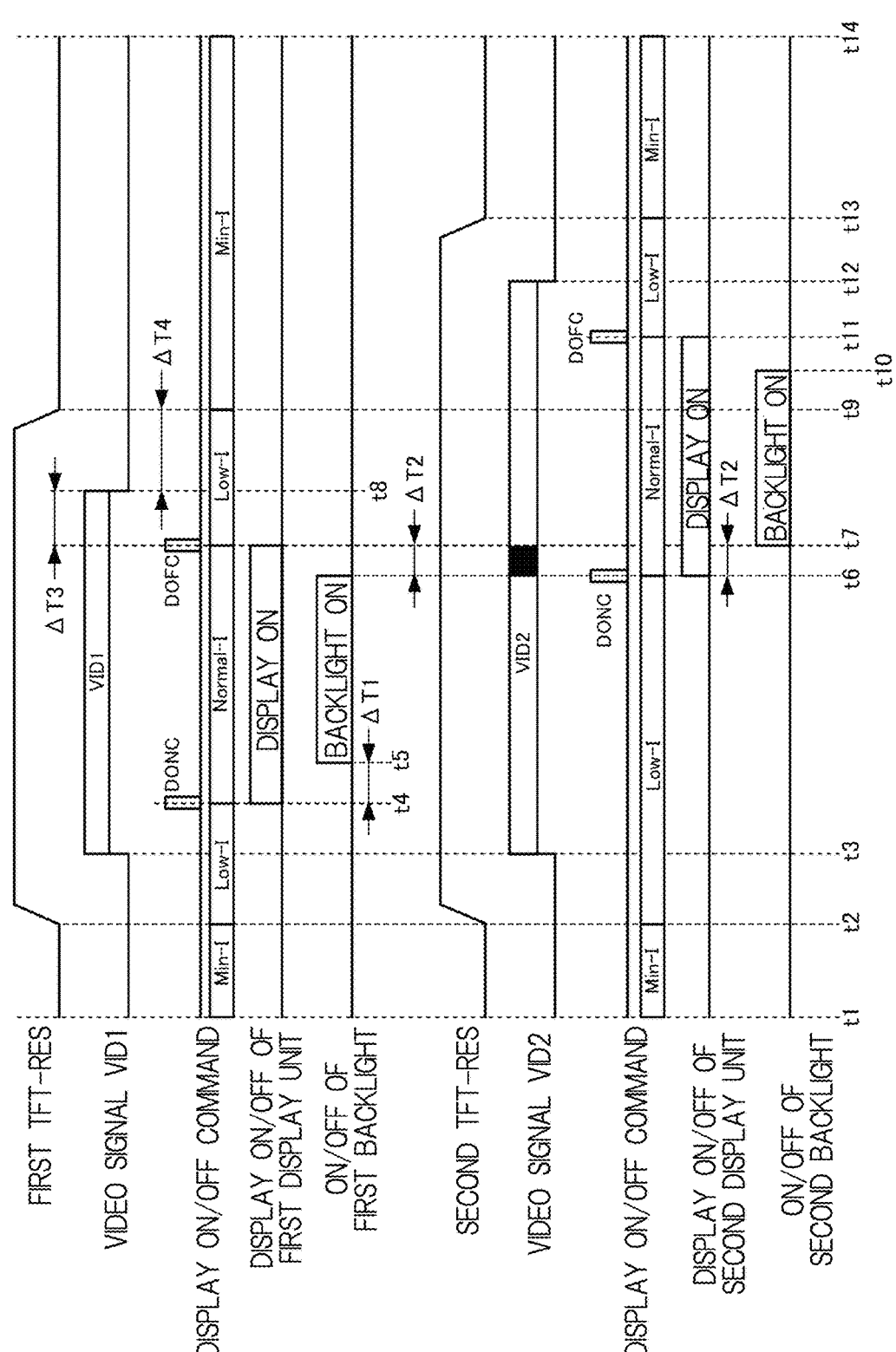
FIG. 13 is a timing chart illustrating an example of a conjunctive control by the display control device according to a third embodiment.
Figure 14:
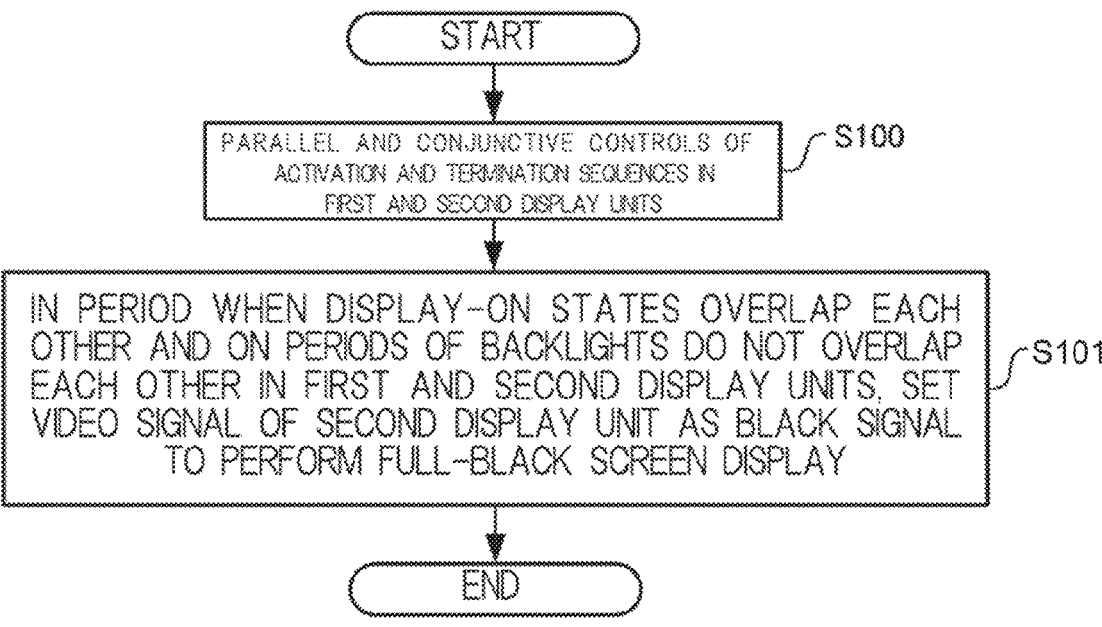
FIG. 14 is a flowchart illustrating a main control procedure according to the third embodiment (FIG. 13).
Figure 15:
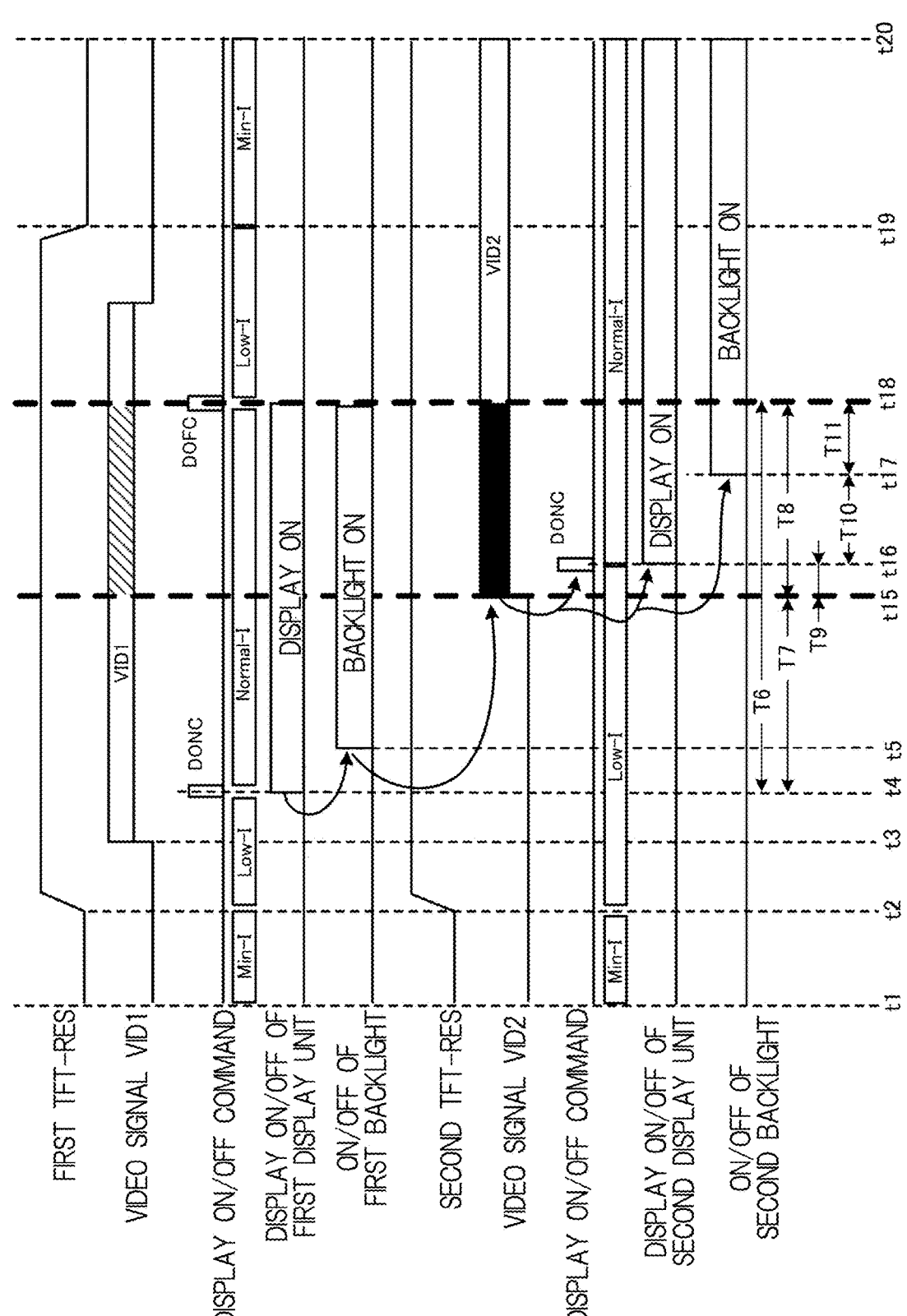
FIG. 15 is a timing chart illustrating an example of a conjunctive control by the display control device according to a fourth embodiment.

For example, the present invention can be further modified and applied as illustrated in FIGS. 13 to 15 (third to fifth embodiments).

Hereinafter, the third to fifth embodiments will be described in order.

Reference is made to FIG. 13. FIG. 13 is a timing chart illustrating an example of the conjunctive control performed by the display control device according to the third embodiment.

FIG. 13 is substantially the same as FIG. 6 according to the first embodiment described above. However, in FIG. 13, the full-black screen display processing is performed in the second display unit 11B (the second liquid crystal display unit 126B), which is different from FIG. 6.

In FIG. 13, similarly to FIG. 6, the ON periods of the first light source (backlight) 9A and the second light source (backlight) 9B are prohibited from temporally overlapping each other.

However, in the non-overlapping period (backlight-off period), each of the first display unit 11A and the second display unit 11B is in a state where image display is possible, in other words, the display-on periods (the periods where image display is possible) of the first display unit 11A and the second display unit 11B temporally overlap each other.

Therefore, for example, a phenomenon may occur in which external light (sunlight, light from a lighting fixture, or the like) enters the housing of the display device (HUD device) 100 and becomes stray light, and the screen of the second display unit 11B, which is supposed to be in a non-display state, becomes slightly bright due to the stray light. In this case, the viewer visually recognizes both the first display unit 11A and the second display unit 11B (the first liquid crystal display unit 126A and the second liquid crystal display unit 126B), which results in poor visibility.

In order to suppress this disadvantage, the full-black screen display processing is performed according to the third embodiment. In other words, a black image is inserted into the video signal VID2 of the second display unit 11B (the second liquid crystal display unit 126B) in which the display operation has started, the screen (image display region) of the second display unit 11B (the second liquid crystal display unit 126B) is displayed as a full-black screen in the period from the time t6 to the time t7 in which the first light source (backlight) 9A and the second light source (backlight) 9B are not on in an overlapping manner, and the full-black display screen is used as a mask for blocking emission of unnecessary light. Thus, the above-described disadvantage can be suppressed.

Reference is now made to FIG. 14. FIG. 14 is a flowchart illustrating a main control procedure according to the third embodiment (FIG. 13).

In step S100, the parallel and conjunctive control of the activation and termination sequences are performed in the first and second display units.

In step S101, in the period when the display-on states overlap each other and the ON periods of the two backlights do not overlap each other in the first and second display units, the video signal of the second display unit is set as a black signal to perform full-black screen display.

Reference is now made to FIG. 15. FIG. 15 is a timing chart illustrating an example of the conjunctive control performed by the display control device according to the fourth embodiment.

In FIG. 15, unlike FIG. 6 according to the first embodiment described above, the ON periods of the first light source (backlight) 9A and the second light source (backlight) 9B are allowed to partially overlap each other in the switching period.

In other words, an overlapping lighting suppression control is performed to prevent the ON period of the first light source unit (backlight) 9A and the ON period of the second light source unit (backlight) 9B from temporally overlapping each other in a partial period, and the first light source unit (backlight) 9A and the second light source unit (backlight) 9B are prohibited from being simultaneously on in the partial period, and thus, the low power consumption is realized.

In FIG. 15, too, the parallel control and the conjunctive control described above with reference to FIG. 6 are performed.

For example, in FIG. 15, with regard to the conjunctive control, when the first display unit 11A enters a display-on state (displayable state) at the time t4, the timing (the time t5) at which the first backlight 9A is turned on is determined, then the timing (the time t15) at which a video signal (image signal) is supplied to the second display unit 11B is determined, then the timing (the time t16) at which the second display unit 11B enters a display-on state (displayable state) is determined, and then the timing (the time t17) at which the second backlight 9B is turned on is determined.

Here, the period from the time t4 to the time t18 is referred to as T2. In other words, the time point at which the period T2 has elapsed from the time t4 is the time t18, and the time t18 is a termination timing of the switching period (the period between two thick broken lines in the drawing).

Further, the time point at which a period T7 has elapsed from the time t4 is the time t15, and the time t15 is the start timing of the switching period. The switching period is a period T8 from the time t15 to the time t18, and is accurately determined.

The time point at which a period T9 has elapsed from the time t15 is the time t16, and the time t16 is a timing at which the second display unit 11B enters a display-on state (displayable state).

The time point at which a period T10 has elapsed from the time t16 is the time t17, and the time t17 is a timing at which the second backlight 9B is turned on.

A period T11 from the time t17 to the time t18 is a period in which the ON periods of the first backlight 9A and the second backlight 9B temporally overlap each other.

In FIG. 15, in the switching period T8 (the times t15 to t18), a black image is supplied to the second display unit 11B (the second liquid crystal display unit 126B), and the full-black screen display is performed in this period. During the switching period, each of the first display unit 11A and the second display unit 11B is capable of displaying an image, and the lighting periods of the first light source (backlight) 9A and the second light source (backlight) 9B overlap each other, and therefore, for example, there may be a case where some image is displayed on the screen of the second display unit (backlight) 9B, which is supposed to be in a non-display state. In this case, the viewer DR visually recognizes the first display unit 11A and the second display unit 11B (the first liquid crystal display unit 126A and the second liquid crystal display unit 126B), which results in poor visibility. Therefore, in the second display unit 11B in which the display operation has started, in at least a partial period of the switching period T8 (the times t15 to t18), the black video signal VID2 is supplied so that the screen (image display region) of the second display unit 11B is displayed as a full-black screen, and the full-black display screen is used as a mask for blocking emission of unnecessary light. Thus, the above-described disadvantage can be suppressed.

In FIG. 15, the full-black screen is displayed over the entire period of the switching period T8, but the present invention is not limited thereto. For example, it is preferable to display a full-black screen at least in the period T11 in which the ON periods of the first light source (backlight) 9A and the second light source (backlight) 9B overlap each other.

In FIG. 15, in the first display unit 11A (the first liquid crystal display unit 126A) where the display is to be terminated, for example, "moving image display for display termination (temporally continuous image display, which can also be referred to as animation display)" is performed, which can notify the viewer DR of the termination of the image display.

In FIG. 15, the period in which the moving image is inserted in the video signal (image signal) VID1 supplied to the first display unit 11A is hatched. For this moving image display, the image erasing method such as slide-out, fade-out, or zoom-out illustrated in d1 to d3 of FIG. 1D can be employed. Slide-out is an image erasing method in which the position of the image being displayed is moved on the screen, and the image is gradually erased as the time elapses.

Fade-out is an image erasing method of gradually erasing the image being displayed by gradually reducing the brightness (luminance) of the image on the screen with the lapse of time.

Zoom-out is an image erasing method of gradually erasing the image being displayed by gradually reducing the size of the image on the screen with the lapse of time.

By using these, the display of an image can be terminated without giving a sense of discomfort to the viewer.

In FIG. 6 described above, there is a blank period in which no image is displayed in any of the first display unit 11A and the second display unit 11B during the display switching period.

Conversely, in FIG. 15, since a moving image (temporally continuous image) suitable for the notification of the termination is displayed on the first display unit 11A (the first liquid crystal display unit 126A) in which the image display is to be terminated, it is possible to realize switching that gives the viewer DR a more natural visual sense with less abrupt feeling.

In FIG. 15, the full-black screen in the second display unit 11B is canceled and the normal image display is set in conjunction with (to be specific, in synchronization with) the timing (a time t18) at which the moving image for display termination is terminated. Thus, when moving image display in the first display unit 11A is terminated, the normal display in the second display unit 11B can be started without delay so that there is no blank period in which no image is displayed. Therefore, also in this respect, more natural and accurate switching can be realized.

Further, by actually using the display device (the HUD device 100), the viewer DR can empirically know that the image display is started in the second display unit 11B when the display of the moving image for display termination is terminated in the first display unit 11A.

Here, since the time from the start to the end of the moving image for display termination is fixed (the period T8 in FIG. 15), the viewer DR can predict how much time elapses from the start of the moving image in the first display unit 11A before the start of image display in the second display unit 11B, which increases a sense of security.

Figure 16:
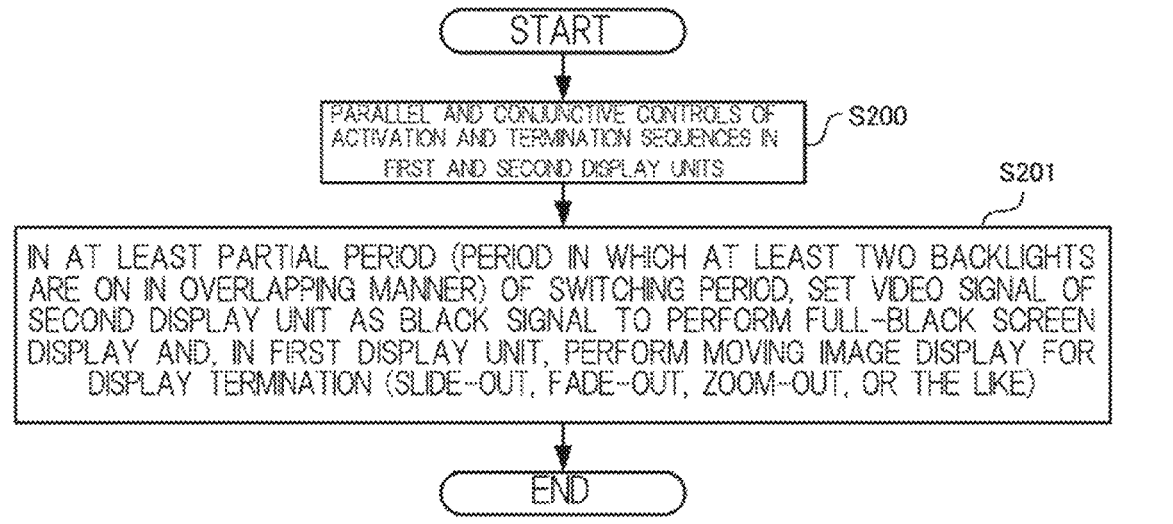
FIG. 16 is a flowchart illustrating a main control procedure according to the fourth embodiment (FIG. 15).

Therefore, it is possible to realize display switching which is more natural, accurate, provides a sense of security, and has desirable visibility. Reference is now made to FIG. 16. FIG. 16 is a flowchart illustrating a main control procedure according to the fourth embodiment (FIG. 15).

In step S200, the parallel and conjunctive control of the activation and termination sequences are performed in the first and second display units.

In step S201, in at least a partial period (a period in which at least the two backlights are on in an overlapping manner) of the switching period, the video signal of the second display unit is set as a black signal to perform full-black screen display, and in the first display unit, moving image display for display termination (slide-out, fade-out, zoom-out, or the like) is performed.

Figure 17:
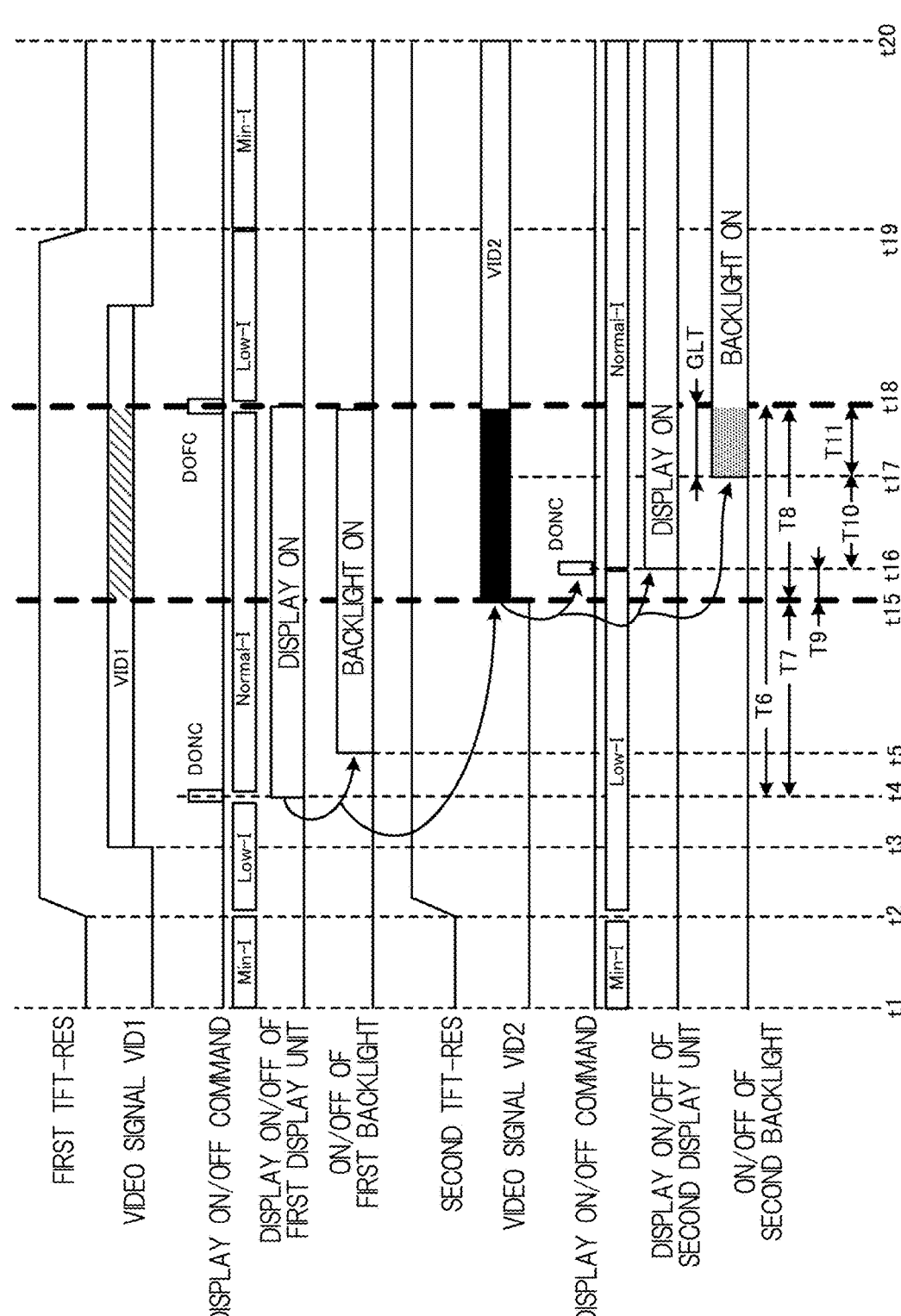
FIG. 17 is a timing chart illustrating an example of a conjunctive control by the display control device according to a fifth embodiment.

Reference is now made to FIG. 17. FIG. 17 is a timing chart illustrating an example of the conjunctive control performed by the display control device according to the fifth embodiment.

The timing control in FIG. 17 is the same as that in FIG. 15 described above.

FIG. 17 is different from FIG. 15 in that light reduction processing is performed to reduce the lighting intensity of the second light source unit (backlight) 9B to be lower than the normal lighting intensity in the period T11 from the time t17 to the time t18 (the period in which the ON periods of the first light source unit (backlight) 9A and the second light source unit (backlight) 9B temporally overlap each other).

In other words, the second display unit 11B performs the full-black screen display, and the second light source unit 9B performs the light reduction processing in at least a partial period of the period in which the full-black screen is displayed (preferably, the period in which the full-black screen display period and the ON period of the second light source unit 9B overlap each other) in the second light source unit (second backlight).

As described above, the full-black screen display has a function as a mask for blocking emission of unnecessary light, and light emission of the light source is unnecessary at least in the period of the full-black screen; however, when the second light source unit 9B is turned off, it takes time to turn on the light source again, and therefore, the light reduction processing is performed. Thus, the power consumption can be further reduced (suppressed).

Figure 18:
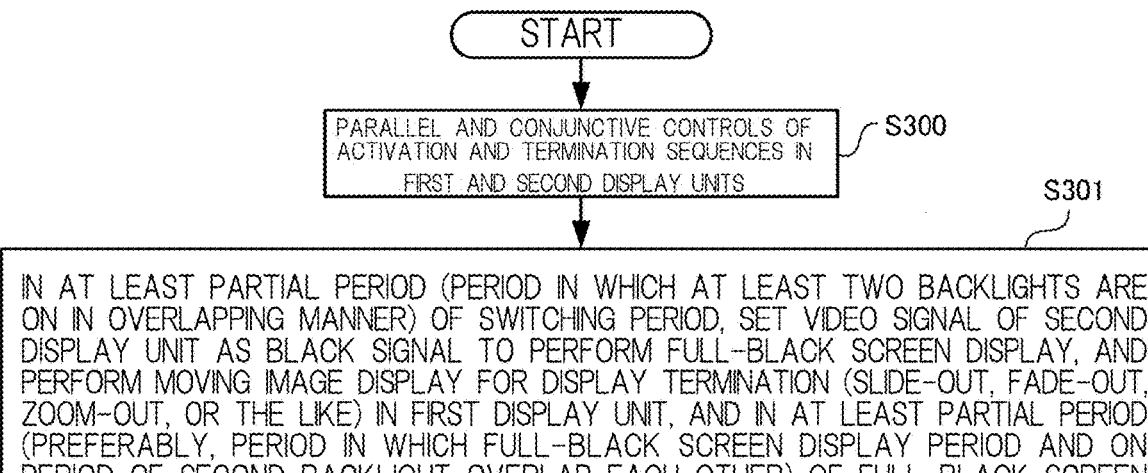
FIG. 18 is a flowchart illustrating a main control procedure according to the fifth embodiment (FIG. 17).

Reference is now made to FIG. 18. FIG. 18 is a flowchart illustrating a main control procedure according to the fifth embodiment (FIG. 17).

In step S300, the parallel and conjunctive control of the activation and termination sequences are performed in the first and second display units.

In step S301, in at least a partial period (the period in which at least the two backlights are on in an overlapping manner) of the switching period, the video signal of the second display unit is set as a black signal to perform full-black screen display, and moving image display for display termination (slide-out, fade-out, zoom-out, or the like) is performed in the first display unit, and in at least a partial period (preferably, the period in which the full-black screen display period and the ON period of the second light source unit (second backlight) overlap each other) of the full-black screen display period, the light reduction processing is performed in the second light source unit (second backlight).

As described above, according to the embodiments of the present invention, it is possible to realize the display control device, the display device such as a head-up display, and the display control method capable of switching between a virtual image and a real image at a high speed while reliably preventing images from being simultaneously displayed on respective display units, to effectively suppress power consumption, and to switch display by an image that is easy for a viewer to see.

REFERENCE SIGNS LIST

1 VEHICLE
2 OPTICAL SYSTEM
9A, 9B FIRST AND SECOND LIGHT SOURCE UNITS (FIRST AND SECOND BACKLIGHTS)
11A, 11B FIRST AND SECOND DISPLAY UNITS
12A, 12B LIGHT-SOURCE CIRCUIT SUBSTRATE
13A, 13B FIRST AND SECOND CONTROL UNITS (DISPLAY CONTROL UNITS)
17 EMISSION WINDOW
19 HOUSING
22 FIRST CURVED MIRROR (CURVED LENS)
24 SECOND CURVED MIRROR (CONCAVE MIRROR OR THE LIKE)
50 DISPLAY CONTROL DEVICE
52 SELECTOR
100 DISPLAY DEVICE (HEAD-UP DISPLAY (HUD) DEVICE)
122A, 122B LIGHT EMITTING DEVICE (E.G., LED)
123A, 123B CONDENSER LENS
124A FIRST LENTICULAR LENS FOR FIRST DISPLAY UNIT
124B FIRST LENTICULAR LENS FOR SECOND DISPLAY UNIT
125 SECOND LENTICULAR LENS FOR FIRST DISPLAY UNIT
129 SECOND LENTICULAR LENS FOR SECOND DISPLAY UNIT
126A, 126B FIRST AND SECOND LIQUID CRYSTAL DISPLAY UNITS (FIRST AND SECOND LIQUID CRYSTAL PANELS)
127A, 127B DIFFUSION PLATE
130A, 130B CIRCUIT SUBSTRATE
WS WINDSHIELD
EB EYEBOX
DR VIEWER (OCCUPANT DRIVER)
EY EYE (VIEWPOINT)
RV REAL IMAGE
V VIRTUAL IMAGE
L1, L2 FIRST AND SECOND OPTICAL PATHS

The invention claimed is:

1. A display control device that controls switching between a first image and a second image in a display device that includes a first image generation unit including a first light source unit and a first display unit and a second image generation unit including a second light source unit and a second display unit and is capable of displaying, through switching, the first image or the second image by using the first image generation unit or the second image generation unit through switching, the display control device comprising a control unit that, in a switching period when display by one image generation unit out of the first image generation unit and the second image generation unit is terminated and display by the other image generation unit is started, performs a parallel control in which a display start operation is performed in the other image generation unit in parallel with a display termination operation in the one image generation unit, performs a conjunctive control in which an operation timing of the other image generation unit is determined with an operation timing of the one image generation unit as a starting point, and performs an overlapping lighting suppression control that prevents an ON period of the light source unit in the one image generation unit and an ON period of the light source unit in the other image generation unit from temporally overlapping each other in at least a partial period in the switching period.

2. The display control device according to claim 1, wherein a control for terminating display by one image generation unit out of the first image generation unit and the second image generation unit and a control for starting display by the other image generation unit are a sequence control for sequentially progressing the control in each of a plurality of phases in accordance with a predetermined order or procedure, and in the parallel control, a particular sequence is complete by execution of all the plurality of phases, but in a state where the sequence is stopped halfway through the phases, the display unit of the one image generation unit and the display unit of the other image generation unit enter a low power consumption mode set to a current consumption lower than a current consumption during a normal operation.

3. The display control device according to claim 1, wherein the control unit in the conjunctive control, sets a predetermined time difference between an OFF timing of the display unit of the one image generation unit and an ON timing of the display unit of the other image generation unit, thereby realizes in the overlapping lighting suppression control, prohibition of temporal overlapping between the ON period of the light source unit of the one image generation unit and the ON period of the light source unit of the other image generation unit.

4. The display control device according to claim 1, wherein the display control device is mounted on a vehicle and allows a viewer who is an occupant of the vehicle to visually recognize a virtual image or a real image as an image through switching, the first display unit is a display unit for virtual image display including a first backlight, the second display unit is a display unit for real image display including a second backlight, the control unit enables switching between the first display unit and the second display unit to be used, activation of the first display unit and the second display unit is performed by an activation sequence, termination of display of the first display unit and the second display unit is performed by a termination sequence, each of the activation sequence and the termination sequence is a control for sequentially progressing each phase of the control in accordance with a predetermined order or procedure, the activation sequence includes a first activation phase to cancel reset of the first display unit and the second display unit, a second activation phase to start input of a video signal to the first display unit and the second display unit, a third activation phase to input a display-on command to the first display unit and the second display unit to set a display-on state, and a fourth activation phase to turn on the first backlight and the second backlight in the first display unit and the second display unit, the termination sequence includes a first termination phase to turn off the first backlight and the second backlight in the first display unit and the second display unit, a second termination phase to input a display-off command to the first display unit and the second display unit to set a display-off state, a third termination phase to terminate input of a video signal to the first display unit and the second display unit, and a fourth termination phase to reset the first display unit and the second display unit, in each of the activation sequence and the termination sequence, the sequence is complete by execution of all the phases, but in a state where the sequence is stopped halfway through the phases, the first display unit and the second display unit enter a low power consumption mode set to a current consumption lower than a current consumption during the normal operation, and the control unit of the display control device performs a first conjunctive control in which, when the first activation phase is executed by canceling reset for one display unit out of the first display unit and the second display unit, the first activation phase is started in parallel for the other display unit in conjunction with a start timing of the activation phase of the one display unit, performs a second conjunctive control in which, when the second activation phase is executed by starting input of a video signal for one display unit out of the first display unit and the second display unit, the second activation phase is started in parallel for the other display unit in conjunction with an input start timing of a video signal or an input termination timing of the video signal in the one display unit, then, only in the one display unit, executes the third activation phase by inputting the display-on command and the fourth activation phase by turning on one of the first backlight and the second backlight thereby starting display of a video in the one display unit, and then, in a case where the first termination phase to the fourth termination phase are executed to terminate display in the one display unit displaying the video, the control unit of the display control device, in a termination period of the display, performs a third conjunctive control in which, in the other display unit out of the first display unit and the second display unit, the third activation phase by inputting the display-on command and the fourth activation phase by turning on the other backlight out of the first backlight and the second backlight are executed in parallel such that a lighting period of one of the first backlight and the second backlight and a lighting period of the other of the first backlight and the second backlight do not overlap each other.

5. The display control device according to claim 4, wherein in a case where, in the second conjunctive control, the second activation phase is executed to start input of a video signal in the other display unit out of the first display unit and the second display unit in conjunction with an input start timing of a video signal in one display unit out of the first display unit and the second display unit, the display control device, in the third conjunctive control, executes the first termination phase in the one display unit out of the first display unit and the second display unit to turn off one of the first backlight and the second backlight at a first timing and subsequently executes the second termination phase at a second timing after elapse of a predetermined first delay time from the first timing to set a display-off state, and in the other display unit out of the first display unit and the second display unit, executes the third activation phase at the first timing to set a display-on state and executes the fourth activation phase at the second timing to turn on the other of the first backlight and the second backlight.

6. The display control device according to claim 4, wherein in a case where, in the second conjunctive control, the second activation phase is executed in the other display unit out of the first display unit and the second display unit to start input of a video signal in conjunction with a timing at which input of a video signal is terminated in one display unit out of the first display unit and the second display unit, the display control device, in the third conjunctive control, executes the first termination phase in the one display unit out of the first display unit and the second display unit to turn off one backlight out of the first backlight and the second backlight at a first timing and subsequently, at a second timing after elapse of a predetermined first delay time from the first timing, executes the second termination phase and the third termination phase to set a display-off state and terminates the input of the video signal, and in the other display unit out of the first display unit and the second display unit, executes the second activation phase to start input of a video signal at the second timing, executes the third activation phase to set a display-on state at a third timing after elapse of a predetermined second delay time from the second timing, and executes the fourth activation phase to turn on the other backlight out of the first backlight and the second backlight at a fourth timing after elapse of a predetermined third delay time from the third timing.

7. The display control device according to claim 6, wherein when an individual video signal is input to each of the first display unit and the second display unit, the display control device supplies the individual video signal via a common signal line and controls a path of a selector connected to the common signal line by using a selection signal thereby determining which display unit out of the first display unit and the second display unit the video signal supplied via the common signal line is to be input to.

8. The display control device according to claim 1, wherein, in the overlapping lighting suppression control, the control unit prohibits temporal overlapping between an ON period of the one light source unit and an ON period of the other light source unit, and performs full-black screen display processing to supply a black video signal to the display unit of the other image generation unit to set full-black screen display in a period from end of the ON period of the light source unit of the one image generation unit to start of the ON period of the light source unit of the other image generation unit.

9. The display control device according to claim 1, wherein, in the overlapping lighting suppression control, the control unit temporally overlaps the ON period of the light source unit in the one image generation unit with the ON period of the light source unit in the other image generation unit in a partial period of the switching period, and performs full-black screen display processing to supply a black video signal to the display unit in the other image generation unit to set full-black screen display in at least a partial period of the switching period.

10. The display control device according to claim 9, wherein, in parallel to the full-black screen display in the display unit of the other image generation unit, the control unit performs moving image display for display termination in the display unit of the one image generation unit, and cancels the full-black screen display in the other display unit and sets normal image display in conjunction with termination of the moving image display for display termination.

11. The display control device according to claim 10, wherein the moving image display for display termination includes image display for sliding out a displayed image, image display for fading out a displayed image, or image display for zooming out a displayed image.

12. The display control device according to claim 9, wherein, in at least a partial period of a period in which the full-black screen display is performed in the display unit of the other image generation unit, the control unit performs light reduction processing to reduce a lighting intensity of the light source unit in the other image generation unit to be lower than a normal lighting intensity.

13. A display device that is mounted on a vehicle and allows a viewer who is an occupant of the vehicle to visually recognize a virtual image or a real image as an image through switching, the display device comprising:

a first display unit for virtual image display including a first backlight;

a second display unit for real image display including a second backlight; and the display control device according to claim 1.

14. The display device according to claim 13, wherein the display device is a head-up display device that includes an emission window and emits display light generated by the first display unit or the second display unit through the emission window to allow the viewer to visually recognize a virtual image and a real image being an image represented by the display light.

15. A display control method for controlling switching between a first image and a second image in a display device that includes a first image generation unit including a first light source unit and a first display unit and a second image generation unit including a second light source unit and a second display unit and is capable of displaying, through switching, the first image or the second image by using the first image generation unit or the second image generation unit through switching, the display control method comprising: in a switching period when display by one image generation unit out of the first image generation unit and the second image generation unit is terminated and display by the other image generation unit is started, performing a parallel control in which a display start operation is performed in the other image generation unit in parallel with a display termination operation in the one image generation unit;

performing a conjunctive control in which an operation timing of the other image generation unit is determined with an operation timing of the one image generation unit as a starting point; and performing an overlapping lighting suppression control that prevents an ON period of the light source unit in the one image generation unit and an ON period of the light source unit in the other image generation unit from temporally overlapping each other in at least a partial period in the switching period.

\* \* \* \* \*